US008897779B2

(12) United States Patent
Tinnakornsrisuphap et al.

(10) Patent No.: US 8,897,779 B2
(45) Date of Patent: Nov. 25, 2014

(54) MESSAGE-BASED EXCHANGE OF ACCESS POINT PILOT SIGNATURE INDICATORS

(75) Inventors: Peerapol Tinnakornsrisuphap, San Diego, CA (US); Chirag Sureshbhai Patel, San Diego, CA (US); Mehmet Yavuz, San Diego, CA (US); Peter Hans Rauber, San Diego, CA (US); Ravindra Manohar Patwardhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 12/849,924

(22) Filed: Aug. 4, 2010

(65) Prior Publication Data
US 2011/0189986 A1    Aug. 4, 2011

Related U.S. Application Data

(60) Provisional application No. 61/231,635, filed on Aug. 5, 2009.

(51) Int. Cl.
*H04W 36/00* (2009.01)
*H04W 36/04* (2009.01)
*H04W 84/04* (2009.01)

(52) U.S. Cl.
CPC .......... *H04W 36/0061* (2013.01); *H04W 36/04* (2013.01); *H04W 84/045* (2013.01)
USPC .......................................... 455/436; 370/328

(58) Field of Classification Search
USPC ........................... 455/436–444; 370/328–329
See application file for complete search history.

(56) References Cited

U.S. PATENT DOCUMENTS

| 8,379,512 B2 | 2/2013 | Gogic et al. |
| 2007/0077928 A1* | 4/2007 | Kim et al. ..................... 455/436 |

(Continued)

FOREIGN PATENT DOCUMENTS

| CN | 1549476 A | 11/2004 |
| CN | 1706134 A | 12/2005 |

(Continued)

OTHER PUBLICATIONS

3rd Generation Partnership Project,Evolved Universal Terrestrial Radio Access (E-UTRA) and Evolved Universal Terrestrial Radio Access Network (E-UTRAN),Overall description,Stage 2 (Release 8),Chapter 22 Support for self-configuration and self-optimization,3rd Generation Partnership Project (3GPP),TechnicalSpecification (TS),XX,XX,[Online] vol. 36.300. no. V8.8.0,1 Mar. 1, 2009,pp. 124-130,XP002591608,Retrieved from the Internet,URL: http,//www.3gpp.org/ftp/Specs/html-info/36300.htm.

(Continued)

*Primary Examiner* — Vladimir Magloire

(57) ABSTRACT

An access point is identified based on a plurality of pilot signatures. Here, in addition to transmitting a pilot signal that is encoded (e.g., spread/scrambled) using a particular pilot signature, an access point transmits a message that includes at least one indication of at least one other pilot signature. For example, an access point may use one PN offset to generate a pilot signal and transmit a message that identifies at least one other PN offset. An access terminal that receives the pilot signal and the message may then generate a pilot report that identifies all of these pilot signatures. Upon receiving a handover message including this pilot-related information, a target network entity with knowledge of the pilot signatures assigned to that access point may then accurately identify the access point as a target for handover of the access terminal.

53 Claims, 20 Drawing Sheets

(56) References Cited

U.S. PATENT DOCUMENTS

| | | |
|---|---|---|
| 2008/0039141 A1 | 2/2008 | Claussen et al. |
| 2009/0097451 A1 | 4/2009 | Gogic |
| 2009/0129354 A1 | 5/2009 | Gupta et al. |
| 2009/0132674 A1 | 5/2009 | Horn et al. |
| 2009/0135784 A1 | 5/2009 | Horn et al. |
| 2010/0029278 A1* | 2/2010 | Fang et al. .................. 455/436 |
| 2010/0040038 A1 | 2/2010 | Tinnakornsrisuphap et al. |
| 2010/0048216 A1 | 2/2010 | Sundarraman et al. |
| 2010/0069072 A1 | 3/2010 | Gogic et al. |
| 2010/0093354 A1 | 4/2010 | Agashe et al. |
| 2011/0189995 A1 | 8/2011 | Tinnakornsrisuphap et al. |
| 2013/0148632 A1 | 6/2013 | Gogic et al. |
| 2013/0150046 A1 | 6/2013 | Gogic et al. |

FOREIGN PATENT DOCUMENTS

| | | |
|---|---|---|
| CN | 101626608 A | 1/2010 |
| EP | 2079263 A1 | 7/2009 |
| TW | 200934267 A | 8/2009 |
| WO | WO2006096764 A2 | 9/2006 |
| WO | WO2008055251 | 5/2008 |
| WO | WO2008103084 A1 | 8/2008 |
| WO | WO2009006041 A1 | 1/2009 |
| WO | 2009049032 | 4/2009 |
| WO | WO-2009054311 A1 | 4/2009 |
| WO | 2009065063 A2 | 5/2009 |
| WO | WO-2009062033 A1 | 5/2009 |
| WO | WO2009067454 | 5/2009 |
| WO | WO2009086991 A1 | 7/2009 |
| WO | WO2010009162 A1 | 1/2010 |

OTHER PUBLICATIONS

E. Tiedemann: "Femtocell activities in 3GPP2 TSG-C", C00-20093003-059R1, Mar. 30, 2009, XP002606265, Retrieved from the Internet: URL:ftp://ftp.3gpp2.org/TSGC/Working/2009/2009-03-New0rleans/TSG-C-2009-03-New%20orleans/Plenary/ [retrieved on Oct. 21, 2010].

International Search Report and Written Opinion—PCT/US2010/044608, International Search Authority—European Patent Office—Feb. 7, 2011.

International Search Report and Written Opinion—PCT/US2010/044609, ISA/EPO—May 11, 2011.

Nokia Siemens Networks et al., Solution(s) to the 36.902A s Automated Configuration of Physical Cell Identity Use Case,3GPP Draft,R3-080812 (PHYIDAUTOCONF),3rd Generation Partnership Project (3GPP),Mobile Competence Centre ,650,Route Des Lucioles ,F-06921 Sophia-Antipolis Cedex ,France,vol. RAN WG3,no. Shenzhen,China,Mar. 26, 2008,XP050164010.

QUALCOMM Europe, "Optimized handover in the presence of PCI confusion",3GPP Draft,R2-083268,3rd Generation Partnership Project (3GPP),Mobile Comeptence Centre,650,Route Des Lucioles,F-06921 Sophia-Antipolis Cedex ,France,vol. RAN WG2,no. Warsaw,Poland,Jun. 24, 2008,XP050140688.

Tiedemann E.G.: "Femtocell Activities in 3GPP2 TSG-C" 3GPP2 Mar. 31, 2009, XP002599307 Retrieved from the Internet: URL:ftp://ftp.3gpp2.org/TSGX/Working/2009/2009-03-New%20Orleans/All%20TSG%20Femto%20Discussion/ XS1 -20090331 -004__ TSG-C__Femto%20Overview-090330.ppt [retrieved on Sep. 2, 2010].

European Search Report—EP12184459—Search Authority—Munich—Nov. 12, 2012.

Taiwan Search Report—TW099126128—TIPO—Jun. 5, 2013.

Airvana, Qualcomm: "Active Call Hand-in in cdma2000 1x", A20-20081027-008r0, 3GPP2, Oct. 27, 2008, p. 7.

C22-20080825-016, "cdma2000 1x Signaling Enhancements for Femto AP Support_update (Stage 2)," 2008, 18 pages.

* cited by examiner

MESSAGE-BASED EXCHANGE OF ACCESS POINT PILOT SIGNATURE INDICATORS

CLAIM OF PRIORITY

This application claims the benefit of and priority to commonly owned U.S. Provisional Patent Application No. 61/231,635, filed Aug. 5, 2009, the disclosure of which is hereby incorporated by reference herein.

CROSS-REFERENCE TO RELATED APPLICATION

This application is related to concurrently filed and commonly owned U.S. patent application Ser. No. 12/849,947, entitled "ACCESS POINT IDENTIFICATION BASED ON MULTIPLE PILOT SIGNATURE INDICATORS," the disclosure of which is hereby incorporated by reference herein.

BACKGROUND

1. Field

This application relates generally to communication and more specifically, but not exclusively, to the use of multiple pilot signature indicators for identifying an access point.

2. Introduction

A wireless communication network may be deployed over a geographical area to provide various types of services (e.g., voice, data, multimedia services, etc.) to users within that geographical area. In a typical implementation, access points (e.g., macro access points providing macro cell coverage) are distributed throughout a network to provide wireless connectivity for access terminals (e.g., cell phones) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points may be deployed (e.g., installed in a user's home) to provide more robust indoor wireless coverage or other coverage for access terminals. Such small-coverage access points may be referred to as, for example, femto access points, femto cells, home NodeBs, home eNodeBs, or access point base stations. Typically, such small-coverage access points are connected to the Internet and the mobile operator's network via a DSL router or a cable modem.

As the access terminal roams throughout the geographical area associated with the network, the access terminal may move away from its serving access point and move closer to another access point. Consequently, when an access terminal gets close to a particular access point, it may be desired to handover (i.e., idle or active handover) the access terminal to that particular access point if that access point provides better radio frequency (RF) coverage and/or additional services.

To enable such handover, access terminals in a network regularly monitor for pilot signals from nearby access points to identify potential target access points. To facilitate this monitoring, each access point transmits a pilot signal with a unique pseudo-random noise (PN) spreading code. Different access points in the network may use a known pilot spreading code (also sometimes known as scrambling code) with different phase offsets—commonly referred to as PN offsets (e.g., for the case of a cdma2000 network). Thus, an access point may be identified based on the PN offset used by that access point. In conventional macro networks, a target access point for handover of an access terminal between two cells is identified based on a forward link (FL) pilot report sent by the access terminal. Such a report may be referred to as, for example, a pilot strength measurement message (PSMM) or as a Route Update (in CDMA high rate packet data technology). The pilot report includes an indication of the FL signal quality (typically pilot strength Ecp/Io) of neighboring access points and pilot phase associated with each of these access points. The pilot phase that is reported may then be mapped to the signature (e.g. pilot PN offset) used by a particular access point. In this way, the identity of the access point that transmitted given pilot signal may be determined assuming no other access points are using the signature.

For effective active (i.e., connected) handover of an access terminal from one access point to another, the network needs to be able to uniquely identify the target access point. However, the number of available PN offsets is typically limited. In some cases, the number of available PN offsets may be limited by the size of the neighbor list that is used to assist access terminals in searching for neighboring PN signals. Here, to reduce overhead and improve efficiency, it may be desirable to limit the number of entries in the neighbor list advertised by a macro access point to a relatively small number (e.g., 20-40).

Consequently, in the event a relatively large number of small-coverage access points are deployed in the same area (e.g., within the coverage of a single macro cell), several of these access points may use the same PN offset for their pilot signals. Unique identification for active handover to such an access point may therefore be difficult due to PN offset confusion. Specifically, confusion may exist as to which access point (e.g., which potential handover target) is being identified when an access terminal in the network reports to its serving access point (e.g., the handover source) that a pilot signal having a given PN offset has been received.

Conventional solutions for dealing with the above problem include a mobile sensing scheme and a scheme where an access point advertises a cell identifier. For example, in a mobile sensing scheme, candidate target femto cells are requested to detect signals from an access terminal on the reverse link (RL) and report this information to the network. The network then identifies the target based on which femto cell reported the best FL signal. In practice, however, such a scheme may have scalability problems in the event a large number of femto cells are deployed. In addition, such a scheme may not provide a sufficient level of accuracy due to FL/RL imbalances (e.g., the femto cell that reports the strongest FL signal may not be the intended target).

In a cell identifier advertising scheme, a femto cell may advertise an access point identification message that includes a mobile switching center (MSC) related identifier (IOS_MSC_ID) and a cell related identifier (IOS_CELL_ID) that uniquely identifies that femto cell at the network. An access terminal may then report this information to the network via a handoff supplementary information notification message. However, such a scheme requires that the macro access points be upgraded to support the handoff supplementary information notification message. In addition such a scheme does not support legacy access terminals. In view of the above, there is a need for effective techniques for identifying access points so that other nodes in the network may efficiently communicate with the access points.

SUMMARY

A summary of sample aspects of the disclosure follows. In the discussion herein, any reference to the term aspects may refer to one or more aspects of the disclosure.

The disclosure relates in some aspects to using a plurality of pilot signatures to provide a unique signature for identifying an access point. For example, an access point may transmit a pilot signal that is encoded (e.g., spread/scrambled) based on a particular pilot signature, and also advertise at least one other pilot signature (e.g., by transmitting a message that includes at least one indication of at least one other pilot signature). As a specific example, an access point may use one PN offset to generate a pilot signal and transmit a message that identifies at least one other PN offset. An access terminal that receives the pilot signal and the message may then generate a pilot measurement report that identifies all of these pilot signatures. Consequently, the pilot measurement report may take the form of a legacy pilot measurement report that may handled by a legacy network, while providing pilot-related information (e.g., a defined set of PN offsets) that more accurately identifies the access point. Upon receiving a handover message including this pilot-related information, a target network entity with knowledge of the pilot signatures assigned to that access point may then accurately identify the access point as a target for handover of the access terminal, as warranted.

The disclosure relates in some aspects to configuring an access point and one or more network entities with the pilot signature-related information that identifies an access point. For example, a network entity may allocate a plurality of pilot signature indicators (e.g., PN offsets) for an access point. The network entity may then send a message including the allocated pilot signature indicators to the access point. The network entity also may send a message including the allocated pilot signature indicators to one or more other network entities (e.g., entities that may need to identify the access point based on the pilot signature indicators).

The disclosure relates in some aspects to an access point that advertises a plurality of pilot signatures. For example, upon receiving an allocation of pilot signature indicators, the access point may transmit a pilot signal based on one of these pilot signature indicators. In addition, the access point may generate and then transmit a message including the other allocated pilot signature indicator(s).

The disclosure relates in some aspects to an access terminal that generates a pilot report that includes indications of all of the pilot signatures allocated for an access point. For example, upon receiving the pilot signal and message transmitted by an access point, the access terminal may generate and then transmit a pilot report that includes at least one indication that is based on the received pilot signature indicator(s) and one indication based on the pilot signature associated with the received pilot signal.

The disclosure relates in some aspects to a identifying an access point as a handover target based on received information that is indicative of all of the pilot signatures allocated for that access point. For example, a network entity may determine (e.g., obtain) a mapping that maps different access points to different sets of cell identifiers or pilot signature indicators. Thus, upon receiving a handover-related message for an access terminal that includes a plurality of cell identifiers or pilot signature indicators, the network entity may identify one of these access points as the handover target based on the mapping and the received cell identifiers or pilot signature indicators.

BRIEF DESCRIPTION OF THE DRAWINGS

These and other sample aspects of the disclosure will be described in the detailed description and the appended claims that follow, and in the accompanying drawings, wherein:

Figure 1:
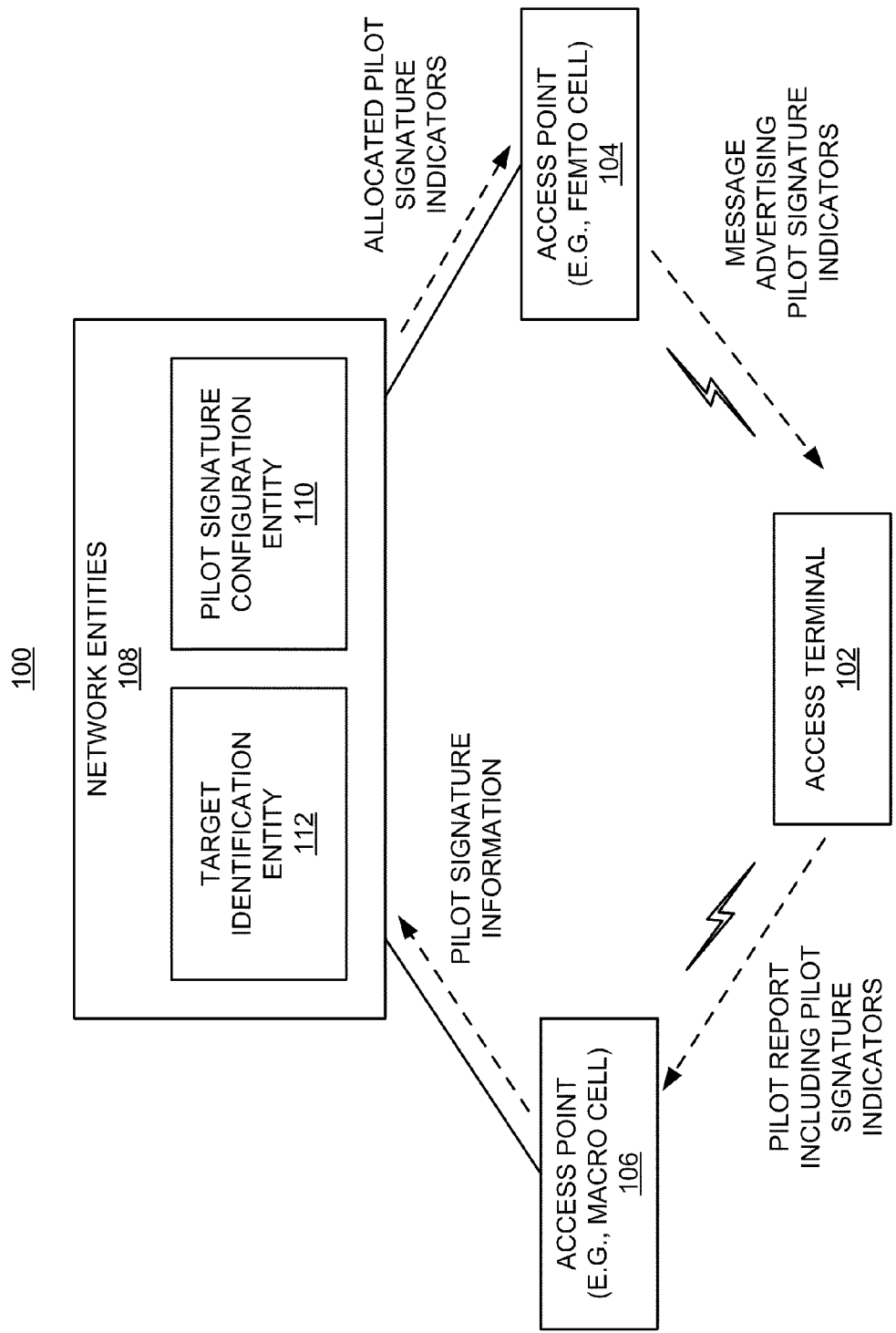
FIG. 1 is a simplified block diagram of several sample aspects of a communication system adapted to identify an access point based on a plurality of pilot signature indicators.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, access networks, or NodeBs, and so on, while access terminals may be referred to or implemented as user equipment, or mobile stations, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, or some other access point in the system 100 (not shown). Each of these access points may communicate with one or more network entities (represented, for convenience, by network entities 108) to facilitate wide area network connectivity. A network entity may take various forms such as, for example, one or more radio and/or core network entities. Thus, in various implementations a network entity may represent functionality such as at least one of: radio network control, network management (e.g., via an operation, administration, management, and provisioning entity), call control, session management, mobility management, gateway functions, interworking functions, or some other suitable network functionality.

In accordance with the teachings herein, a pilot signature configuration entity 110 allocates a plurality of pilot signature indicators for certain access points in the system 100. For example, the pilot signature configuration entity 110 may allocate two or more PN offsets for the access point 104 (e.g., a femto cell). The pilot signature configuration entity 110 also may send this information to other entities in the system 100. For example, a target identification entity 112 may use this pilot signature information to identify the access point as a target for a handover procedure.

The access point 104 uses one of its allocated pilot signature indicators for transmitting a pilot signal and advertises the other allocated pilot signature indicator(s). That is, the access point 104 may broadcast a message that identifies the other allocated pilot signature indicator(s). This message also may include a defined (e.g., artificial) indication of pilot strength (e.g. Ecp/Io—the ratio of received pilot energy to the total received power) associated with each pilot signature indicator included in the message.

When the access terminal 102 is in the vicinity of the access point 104, the access terminal 102 may receive the pilot signal and the message transmitted by the access point 104. In accordance with the teachings herein, the access terminal 102 generates a pilot report that includes pilot signature indicators based on the received pilot signal and the received message. For example, the pilot report may include an indication of the PN offset that the access point 104 used to transmit the pilot signal and the pilot report may include one or more indications of the PN offsets that were identified in the message sent by the access point 104. For each PN offset, this report may include pilot measurement information such as, for example, the PN phase corresponding to the PN offset, as well as a corresponding indication of pilot strength. Also, in the event there are other access points in the vicinity of the access terminal, the pilot report may include similar pilot signature-related information for these other access points.

In accordance with conventional practice, at some point in time, the access terminal 102 sends the pilot report to its current serving access point (e.g., access point 106). If the information in the pilot report indicates that handover of the access terminal is warranted, a handover message including information based on the pilot report may be sent to another network entity (e.g., the entity 112) that is able to determine the identity of the target access point for handover of the access terminal 102. In accordance with conventional practice, this handover message may include, for example, the reported PN phases or cell identifiers corresponding to the reported PN phases. The entity 112 may then use the pilot signature configuration information it received from the entity 110 to identify any access points that use PN phases that match those indicated by the pilot signature-related information received via the handover message.

These and other aspects of the disclosure will now be described in more detail in conjunction with the flowchart of FIGS. 2 and 3. For convenience, the operations of FIGS. 2 and 3 (or any other operations discussed or taught herein) may be described as being performed by specific components (e.g., components as shown in FIGS. 1, 10, 11, and 12). It should be appreciated, however, that these operations may be performed by other types of components and may be performed using a different number of components. It also should be appreciated that one or more of the operations described herein may not be employed in a given implementation.

Figure 2:
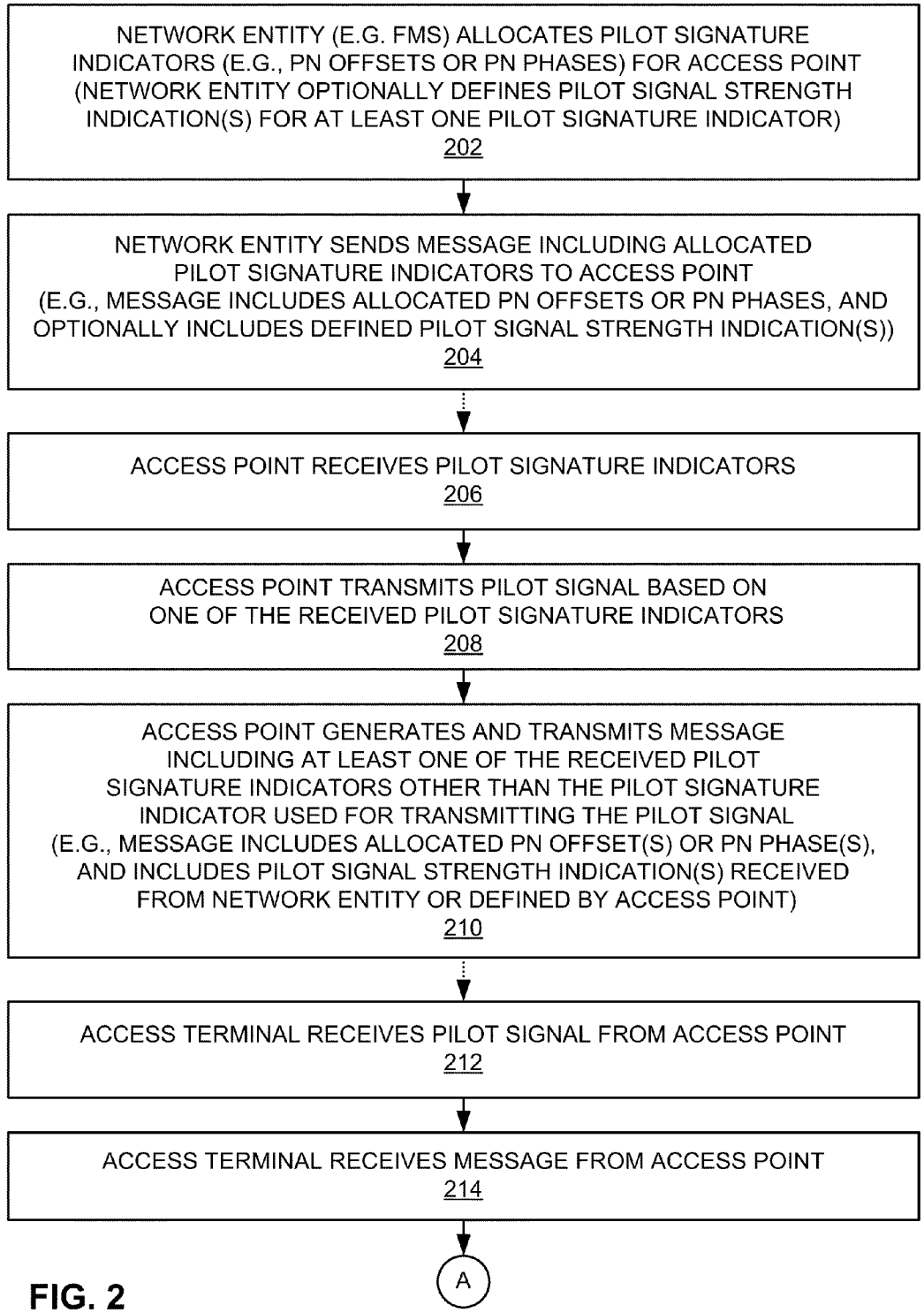
FIGS. 2 and 3 are a flowchart of several sample aspects of operations that may be performed in conjunction with identifying an access point based on a plurality of pilot signature indicators.

As represented by block 202 of FIG. 2, at some point in time a network entity allocates pilot signature indicators for an access point. For example, a femto management server may allocate two or more PN offsets for a femto cell when that femto cell is deployed. In such a case, the pilot signature indicators may identify the PN offsets (e.g., a number from 0 to 511 for a case where 512 PN offsets are available for use) or may identify the corresponding PN phases (e.g., the number of chips corresponding to the phase shift from PN phase 0). It should be appreciated that other types of pilot signature indicators may be employed in different implementations. For example, a pilot signature indicator may identify a primary scrambling code (PSC) or a physical cell identifier (PCI) that is used for spreading (scrambling) a pilot signal.

The network entity allocates one of the pilot signature indicators for transmitting a pilot signal and the remaining pilot signature indicator(s) is/are used for identification of the access point. For example, in a case where three pilot signature indicators are allocated for an access point, the access point generates a pilot signal based on one of the pilot signature indicators and advertises the other two pilot signature indicators. As discussed in more detail below, a pilot signature indicator allocated for non-pilot signal use may be obtained from a set of pilot signature indicators that are not allocated for pilot signal use in a corresponding area of the network (e.g., the coverage area managed by a particular mobile switching center).

In some cases, the network entity also defines a pilot signal strength indication to be advertised along with each advertised pilot signature indicator. As discussed in more detail below, this defined pilot signal strength indication may subsequently be used by an access terminal to generate a pilot report.

As represented by block 204, the network entity configures the access point by sending a message including the allocated pilot signature indicators to the access point. If applicable, this message also includes one or more pilot signal strength indications. As discussed herein, the network entity may also send this configuration information to one or more other entities in the network.

The access point receives the pilot signature indicators as represented by block 206. Then, based on one of the received pilot signature indicators, the access point transmits a pilot signal as represented by block 208. For example, the access point may transmit its pilot signal through the use of a spreading code (e.g., a PN spreading code) that is based on the allocated pilot indicator (e.g., a particular PN offset).

As represented by block 210, the access point also generates and transmits a message (e.g., an access point identifier message (APIDM)) that includes at least one of the received pilot signature indicators other than the received pilot signal that is used to transmit the pilot signal. For example, the access point may receive indications of PN offsets 0 and 2 at block 206. The access point may then use PN offset 0 for sending the pilot signal at block 208. In this case, the message generated at block 210 will include an indication that is based on PN offset 2. In some implementations, the message also may optionally include an indication that is based on PN offset 0 in this example.

The message generated at block 210 may include a pilot signal strength indication for each advertised pilot signature indicator. As mentioned above, in some cases the access point is configured with the pilot signal strength indication(s). In other cases, however, the access point may define the pilot signal strength indication(s).

As represented by blocks 212 and 214, an access terminal in the vicinity of the access point may receive the pilot signal and the message transmitted by the access point (as well as similar information transmitted by any other nearby access points). Accordingly, the access terminal may acquire the pilot signature-related information transmitted by the access point. For example, by decoding the received pilot signal, the access terminal may identify the PN offset used to transmit the pilot signal. In addition, the access terminal may read the PN offsets included in the received message.

The information received at blocks 212 and 214 may trigger the sending of a pilot report. For example, sending of a report may be triggered if a received signal strength of a pilot signal exceeds a certain threshold level (e.g., exceeds the received signal strength of a signal from the serving macro cell by a defined margin).

Figure 3:
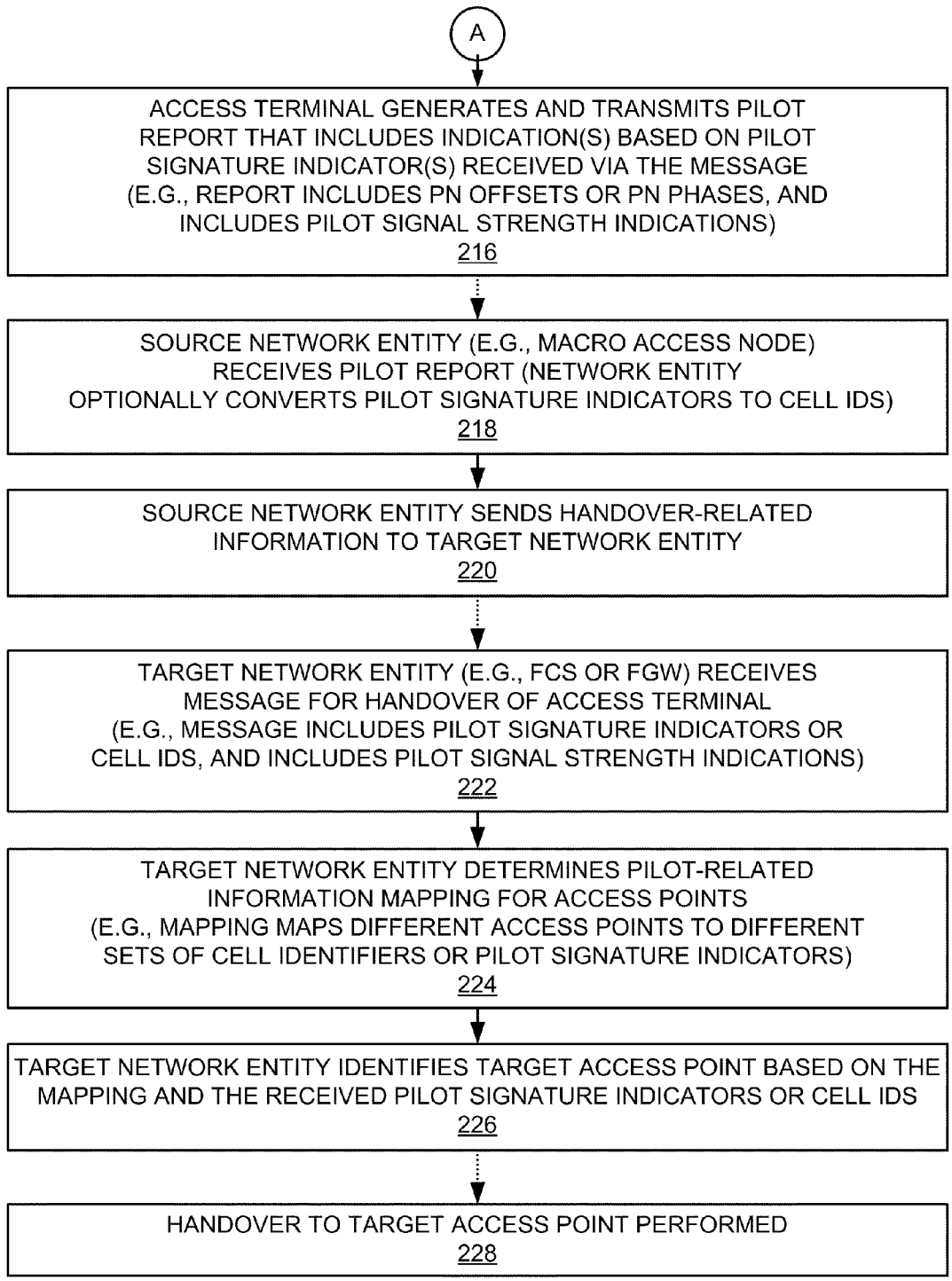

As represented by block 216 of FIG. 3, the access terminal generates and transmits a pilot report that includes at least one indication based on the pilot signature indicator(s) received via the message. Such an indication may take various forms depending on the form of the received pilot signature indicator and whether the access terminal converts the received indicator to another form. For example, in some cases the access terminal receives PN offsets from the access point and converts these PN offsets to the corresponding PN phases, and includes indications of these PN phases in the pilot report. In other cases, the access terminal receives PN phases from the access point and includes indications of these PN phases in the pilot report.

The pilot report also includes a pilot signal strength indication for each indication entry in the report. For example, the access terminal may measure the signal strength of the pilot signal received at block 212 and include an indication of this value in the pilot report. In addition, the access terminal may include the pilot signal strength indications received via the message at block 214 in the pilot report.

Advantageously, this pilot report may be provided in a form that is compatible with the operation of legacy network entities. For example, for hard handover for legacy mobile stations (and also in CDMA HRPD), only pilot measurements (e.g., PN phases and strengths) are reported. As discussed herein, the pilot report transmitted at block 216 may simply include PN phase and received signal strength information. Thus, the pilot report may be handled by legacy entities even though the pilot report includes additional information (e.g., additional PN phase indications) that is ultimately used in combination by another network entity to uniquely identify the access point.

As represented by block 218, a network entity (e.g., a macro access point) currently serving the access terminal receives the pilot report. In accordance with conventional practice, this network entity or an associated network entity (e.g., a mobile switching center) may determine whether handover of the access terminal is warranted. For example, handover operations may be triggered if one of the received signal strength values in the pilot report exceeds a similar macro signal level by a defined margin.

In some implementations (e.g., CDMA 1× technology), the source network entity converts the received pilot signature indicators to another form of indication. For example, a macro base station (or an associated mobile switching center) may convert each received PN phase to a corresponding cell identifier based on a mapping known to that network entity. In such a case, the source operations describe here may be performed on the basis of the corresponding cell identifiers.

The source network entity (e.g., a mobile switching center) also may determine whether it can identify the handover target. For example, if the highest received signal strength is associated with a PN phase (or a cell identifier as discussed above) that the network entity knows is being used by a particular access point, the network entity may communicate with that access point to facilitate handover of the access terminal. On the other hand, if the network entity does not know the identity of the access point associated with that PN phase (or cell identifier), the network entity may identify another network entity (e.g., through the use of a look-up table) that advertises that it does know the identity of the access point. For example, configuration information in a source macro mobile switching center may indicate that another mobile switching center can handle a particular cell identifier, and that yet another mobile switching center can handle another cell identifier. In such a case, the source network entity may send a handover message including the received or generated handover-related information to the other network entity as represented by block 220.

From the above it may be seen that a legacy macro access point may need to be configured with the PN phase indicators that are allocated for being advertised (e.g., via an APIDM). However, a mechanism for configuring an access point in this manner is already available in legacy systems. Implementation of the teachings herein may thus only involve configuring the legacy macro access points with the PN phase (and, in some cases, associated cell identifier) information using this mechanism. Advantageously, the legacy entity does not need to know about the actual combinations allocated for an access point. Instead, this information is provided to another entity (e.g., a femto convergence server or a femto gateway) that performs the actual operation of identifying the access point.

As represented by block 222, a target network entity (e.g., a femto convergence server or a femto gateway) may receive the handover message sent by the source network entity at block 220. Thus, this message may include, for example, the pilot signature indicators (e.g., PN phase indicators) or the cell identifiers discussed above. In addition, the handover message may include the received pilot signal strength indications described above.

As represented by block 224, at some point in time, the target network entity determines a pilot-related information mapping for a set of access points (e.g., the access points under the supervision of the network entity). This mapping may take different forms in different implementations. For example, in some cases, a given entry of the mapping maps a given access point with the set of the pilot signature indicators (e.g., PN phase indicators or PN offset indicators) allocated for that access point. In some cases, a mapping entry maps a given access point with a set of cell identifiers that are, in turn, assigned to the set of the pilot signature indicators that are allocated for the access point.

As represented by block 226, the target network entity may therefore identify the target access point for handover of the access terminal based on the mapping and the received pilot signature-related information. For example, the network entity may compare the received PN phases indicators (or cell identifiers) with the entries in the mapping to identify the access point that transmitted the pilot signal and the message that caused these PN phases indicators (or cell identifiers) to be sent to the target network entity. As a specific example, if the highest received signal strength in the measurement report is associated with PN phases 0 and 2, the network entity determines which entry in the mapping contains this set of PN phases. The network entity may then look up the identity of the corresponding access point from this entry.

As represented by block 228, once the appropriate target has been identified, handover of the access terminal to the target is performed. For example, the target network entity may facilitate communication between the source access point and the target access point to complete the handover.

Figure 4:
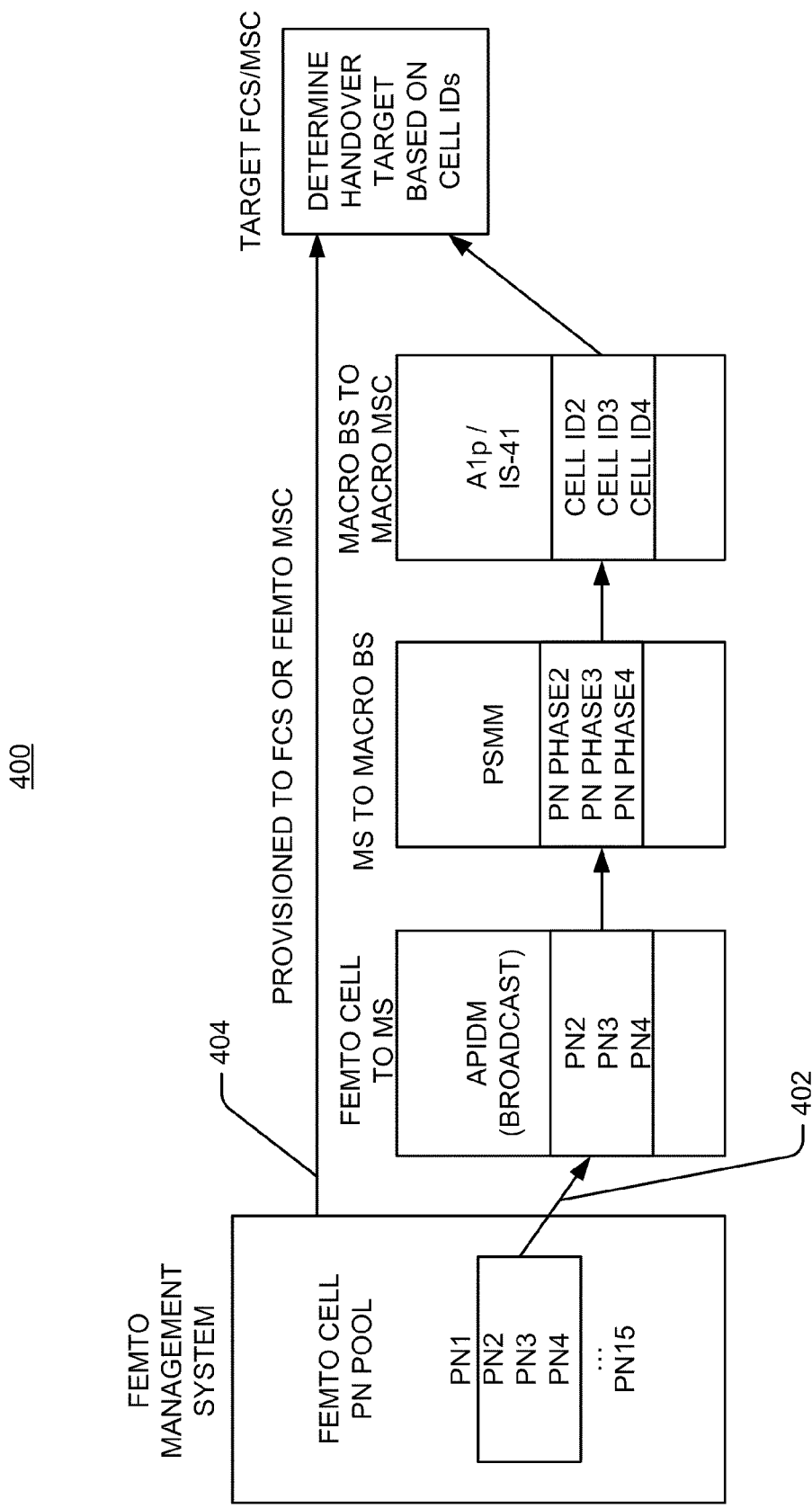
FIG. 4 is a simplified block diagram of several sample aspects of a communication system adapted to identify an access point based on a plurality of cell identifiers associated with pilot signature indicators allocated to the access point.

FIG. 4 illustrates a simplified example of a CDMA 1× system 400 that describes sample message flow that may be used in such a system in accordance with the teachings herein. Here, a femto management system (FMS) maintains a pool of PN offsets (PN1-PN15) that may be allocated to femto cells. In this example, PN2-PN4 are allocated for a particular femto cell as represented by the arrow 402. The FMS also provisions this information to an appropriate network entity (e.g., a femto convergence server (FCS) or femto MSC) as represented by the arrow 404. The femto cell broadcasts a message (e.g., APIDM) that includes PN2-PN4 and this message is received by a mobile station (MS) in the vicinity. The MS then transmits a pilot strength measurement message (PSMM) that includes the corresponding PN phase information (PN phase2-PN phase4) to its serving macro base station (BS). The macro BS, in turn, sends corresponding cell identifiers (cell ID2-cell ID4) to its macro MSC (via an A1p interface) which forwards the cell identifiers to the target FCS/MSC (via an IS-41 interface). Here, there is a 1:1 mapping between each PN offset (and PN phase) and each cell ID. The target FCS/MSC then determines the handover target based on the reported cell IDs.

Figure 5:
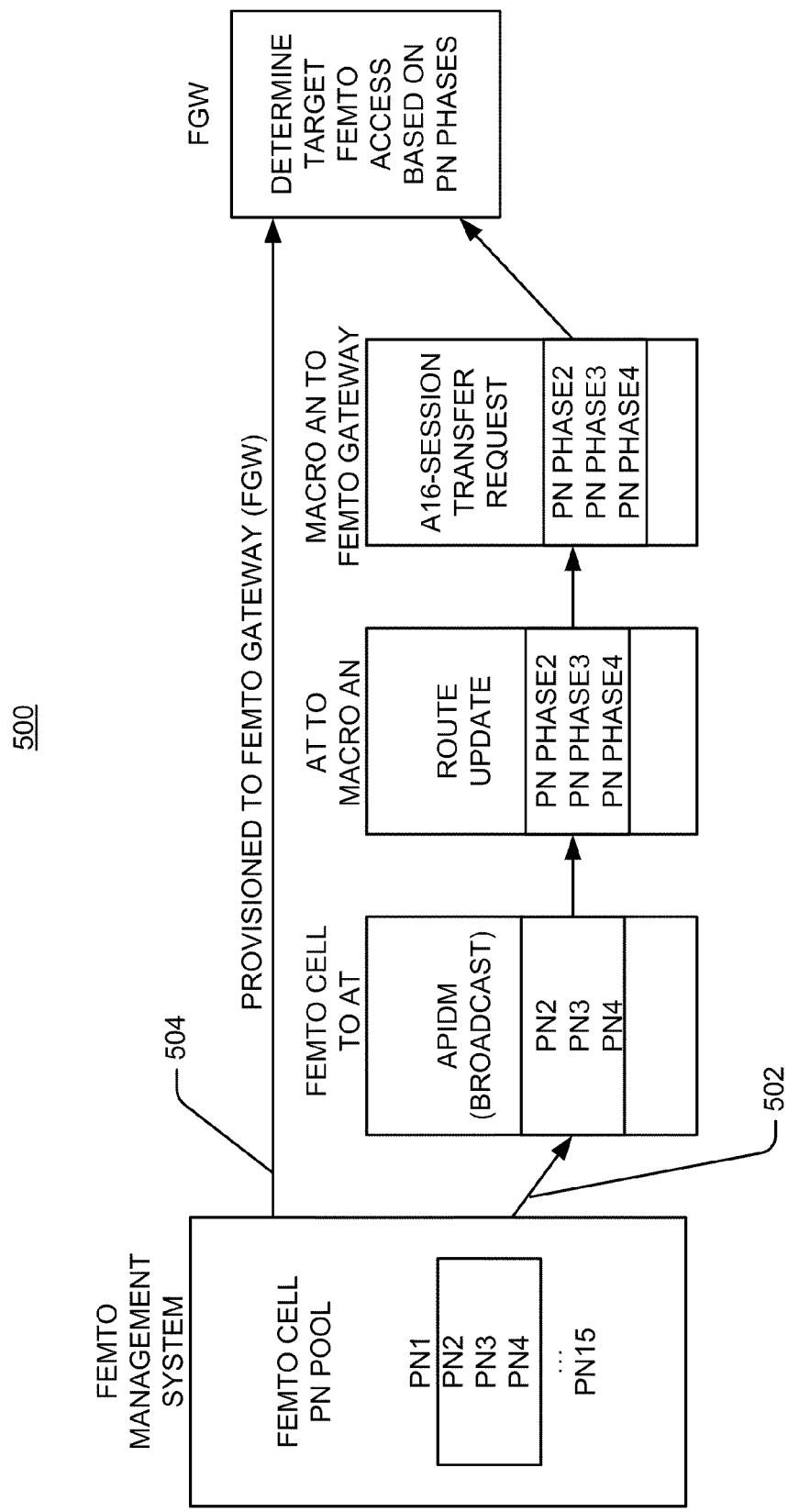
FIG. 5 is a simplified block diagram of several sample aspects of a communication system adapted to identify an access point based on a plurality of PN phases associated with pilot signature indicators allocated to the access point.

FIG. 5 illustrates a simplified example of a CDMA HRPD system 500 that describes sample message flow that may be used in such a system in accordance with the teachings herein. Again, a femto management system (FMS) maintains a pool of PN offsets (PN1-PN15) that may be allocated to femto cells. PN2-PN4 are allocated for a particular femto cell as represented by the arrow 502. The FMS also provisions this information to an appropriate network entity (e.g., a femto gateway (FGW)) as represented by the arrow 504. The femto cell then broadcasts a message (e.g., APIDM) that includes PN2-PN4 that may be received by an access terminal (AT) in the vicinity. The AT transmits a Route Update message that includes the corresponding PN phase information (PN phase2-PN phase4) to its serving macro access network (AN). The macro AN, in turn, sends the PN phase information to the target FGW (by embedding the Route Update message in an A16 session transfer request). The target FGW then determines the handover target based on the reported PN phases.

With the above in mind, additional details of operations that may be performed in accordance with the teachings herein will be described with reference to FIGS. 6-9.

Figure 6:
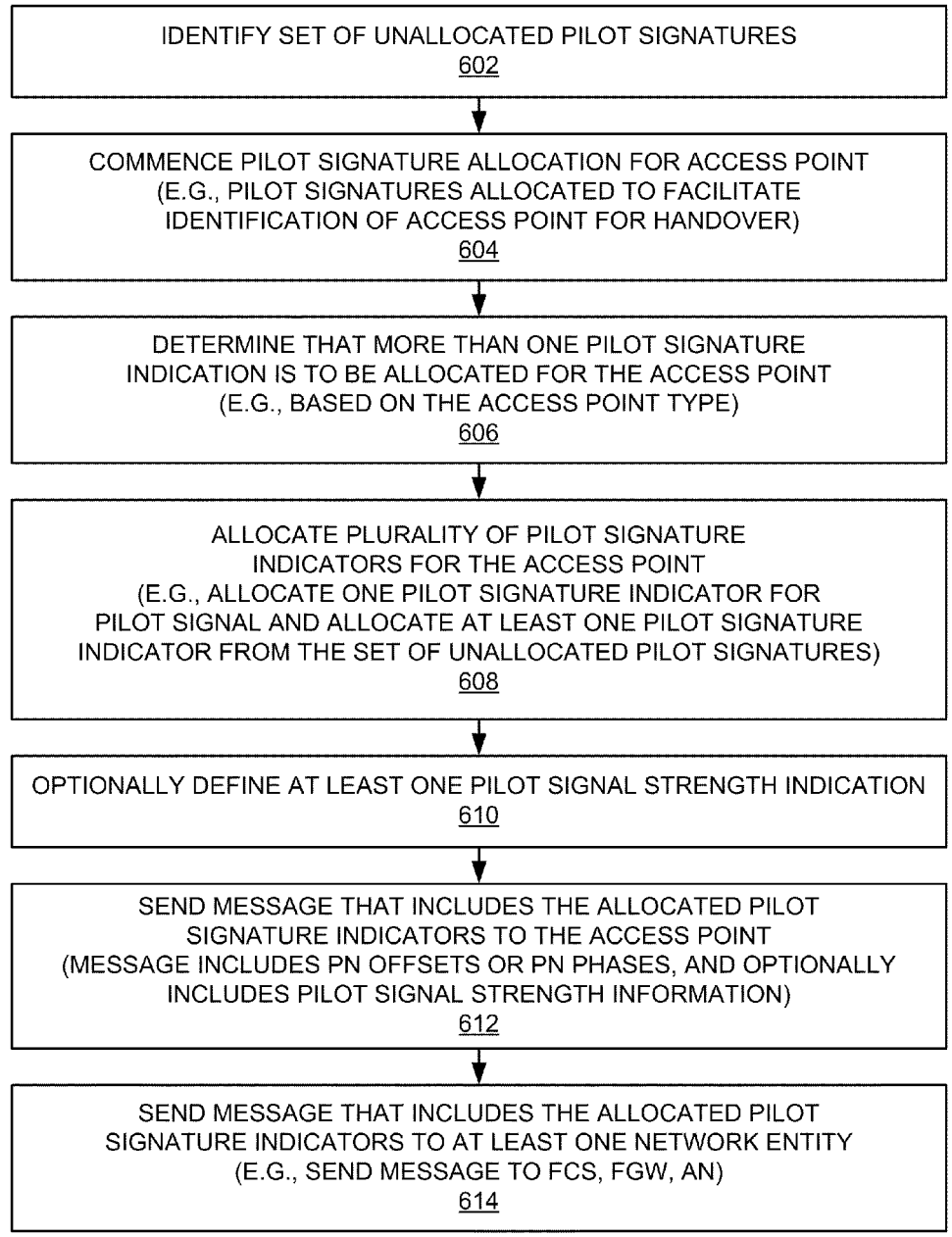
FIG. 6 is a flowchart of several sample aspects of operations that may be performed in conjunction with configuring pilot signature indicators for an access point.

FIG. 6 describes sample operations that may be performed to allocate pilot signature indications for an access point. These operations may be performed, for example, by a network entity such as a femto management system.

As represented by block 602, a set of unallocated pilot signatures that may be allocated to access points (e.g., femto cells) are identified. For example, this set may comprise all of the PN offsets that not being used by macro access points in a given area.

In some cases, this set of pilot signatures may be designated for non-pilot transmission use only. For example, out of a set of available pilot signatures (e.g., 256 available PN offsets), a first group may be designated for use for transmitting pilot signals, while a second group may be designated only for being sent in a message (e.g., APIDM) by an access point. In other words, pilot signatures of the second group may not be used for scrambling transmitted pilot signals. Advantageously, this second group of pilot signatures may be used to identify access points without the need to advertise these pilot signatures in a macro neighbor list, and without the need for access terminals to conduct searches for these pilot signatures. In some cases, a pilot signature that is designated for transmitting pilot signals also may be designated for being advertised (e.g., in an APIDM).

The allocation of a set of pilot signatures may be made for a designated area. For example, the designation of a set of pilot signatures so that they will only be advertised in APIDMs may only apply to an area corresponding to the coverage areas of access points supervised or controlled by a given femto management system or a given mobile switching center. Thus, in some aspects, a pilot signature indicator may comprise a value that is indicative of a pilot signature that is not currently allocated for pilot scrambling use by any access points associated with an area of a wireless network.

As represented by block 604, at some point in time, pilot signature allocation for an access point is commenced. For example, a femto management system may initiate this allocation when a femto cell is deployed, powered-up, reset, or reconfigured.

As discussed herein, this process may involve allocating multiple pilot signature indicators for a single access point to provide a unique signature for that access point that may then be used to uniquely identify the access point during handover. Accordingly, as represented by block 606, a determination may thus be made that more than one pilot signature indication is to be allocated for a given access point (e.g., for access point of a given type). For example, all femto cells in a given network may be allocated more than one PN offset while all other access points in that network may be allocated a single PN offset.

Thus, as represented by block 608, the allocation entity may allocate a plurality of pilot signature indicators (e.g., each of which comprises a specific value corresponding to a particular PN offset or PN phase) for a given access point. As discussed above, one of these pilot signature indicators is allocated for transmission of a pilot signal by the access point, while the remaining pilot signature indicator(s) is/are allocated for being advertised by the access point (e.g., via an APIDM).

As represented by block 610, the allocation entity may optionally define pilot signal strength information for each pilot signature indicator that is allocated for being advertised. In some cases, this pilot signal strength is set to a value that ensures there will not be undue interference with network handover trigger mechanisms (e.g., the selected value won't trigger unnecessary initiations of handover procedures). For example, the pilot signal strength may be defined at a value that is below a minimum received signal strength that is specified for maintaining a call with a macro access point.

In some implementations, the defined pilot signal strength may be used to define the identity signature for the access point. That is, an identity signature for a given access point may be generated by allocating different PN offset indictors (or PN phase indicators) and different associated pilot strength values. Thus, as discussed below, a network entity (e.g., femto convergence server or femto gateway) also may take these pilot signal strength indications into account when identifying the target for a handover.

As represented by block 612, the allocation entity sends a message that includes the allocated pilot signature indicators to the access point. As discussed herein, this message may include PN offset indicators, PN phase indicators, PSC indicators, PCI indicators, or some other type of indicators. In addition, this message may include the pilot signal strength indication(s) defined at block 610.

As represented by block 614, the allocation entity also sends a message that includes the allocated pilot signature indicators (and, optionally, defined pilot signal strength indication(s)) to one or more other network entities. For example, this message may be sent to a femto convergence server, a femto gateway (also referred to as a femto cell gateway), an access network, some other entity, or some combination of these entities.

Figure 7:
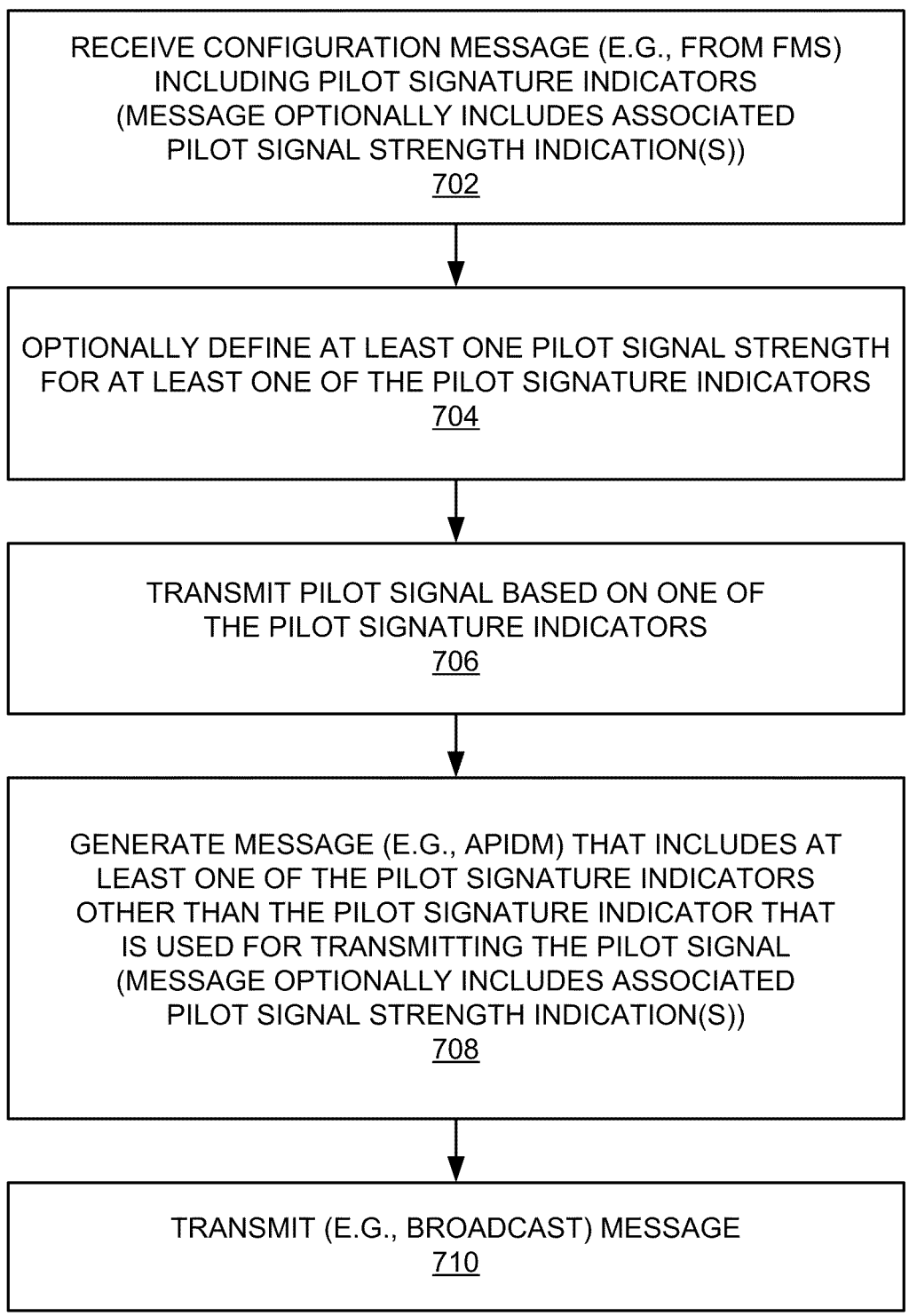
FIG. 7 is a flowchart of several sample aspects of operations that may be performed in conjunction with advertising pilot signature indicators at an access point.

FIG. 7 describes sample operations that may be performed by an access point in conjunction with advertising its pilot signature-related information. These operations commence at block 702 where the access point receives a configuration message that includes the pilot signature indicators allocated for that access point. In addition, as discussed above, in some cases this message includes defined pilot signal strength information for one or more of the pilot signature indicators.

As represented by block 704, the access point may optionally define pilot signal strength information for each pilot signature indicator that is allocated for being advertised (e.g., in the event the access point did not receive any pilot signal strength indications from the femto management system). In some cases, a pilot signal strength indication is set to a value that ensures there will not be undue interference with network handover trigger mechanisms (e.g., as discussed above).

As represented by block 706, the access point transmits a pilot signal based on one of the allocated pilot signature indicators. For example, the access point may use an allocated PN offset to adjust the phase of the spreading code the access point uses to transmit the pilot signal.

As represented by block 708, the access point generates a message that includes at least one of the received pilot signature indicators other than the received pilot signal that is used to transmit the pilot signal. This message also may include a pilot signal strength indication for each advertised pilot signature indicator as discussed herein.

As represented by block 710, the access point transmits the message generated at block 708. For example, the access point may repeatedly (e.g., periodically) broadcast an APIDM message or some other suitable message (e.g., an existing message modified to include the pilot information or a new message including this information).

Figure 8:
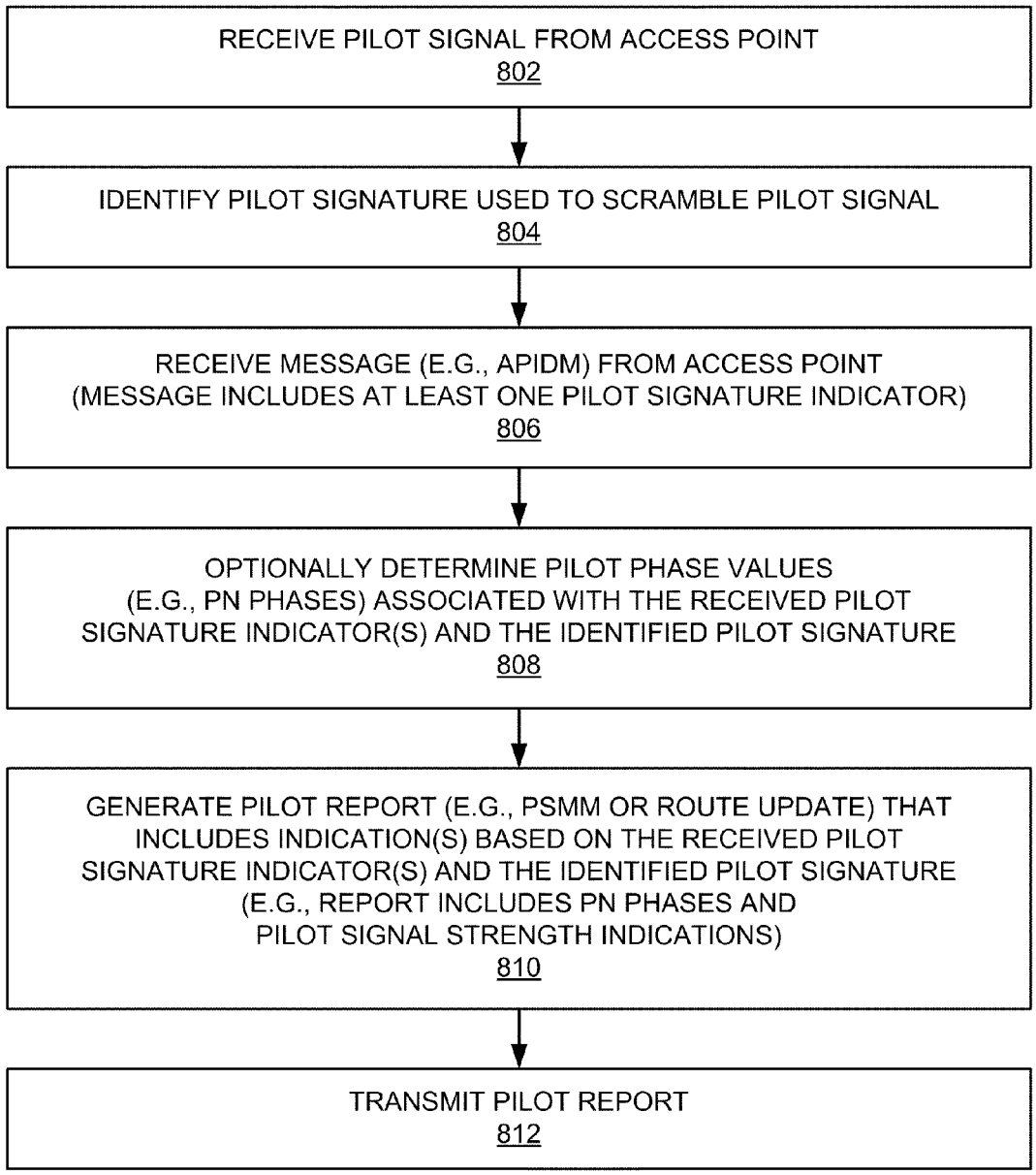
FIG. 8 is a flowchart of several sample aspects of operations that may be performed in conjunction with providing a pilot report based on pilot signature indicators received from an access point.

FIG. 8 describes sample operations that may be performed by an access terminal in conjunction with generating a pilot report. As discussed herein, this pilot report is based, in part, on advertised pilot signature-related information received from an access point.

As represented by block 802, the access terminal receives a pilot signal from an access point. As represented by block 804, the access terminal identifies the pilot signature (e.g., PN offset or PN phase) that was used by the access point to send the pilot signal (e.g., using known techniques).

As represented by block 806, the access terminal also receives a message (e.g., APIDM) from the access point. As discussed herein, this message includes at least one pilot signature indicator allocated for that access point and, optionally, defined pilot signal strength information for each pilot signature indicator.

As represented by block 808, the access terminal optionally determines pilot phase values (e.g., PN phases) associated with the at least one pilot signature indicator received at block 806 and, if necessary, the pilot signature determined at block 804. For example, in the event a received pilot signature indicator comprises a set of PN offsets, the access terminal may use the following formula to calculate the PN phase (designated $PN\_Phase_i$) for each PN offset (designated $PN_i$): $PN\_Phase_i = (PILOT\_ARRIVAL + (64 \times PN_i)) \mod 2^{15}$. Here, PILOT_ARRIVAL is the measured arrival time of the physical femto access point pilot (e.g., as defined in section 2.6.6.2.4 of C.S0005-E).

As represented by block 810, the access terminal generates a pilot report that includes at least one indication based on the pilot signature indicator(s) received at block 806 and an indication based on the pilot signature identified at block 804. For example, these indications may correspond directly to the received indicator(s) and identified pilot signature or these indications may correspond to the pilot phase values (e.g., PN phases) determined at block 808.

The pilot report also includes a pilot signal strength indication for each indication entry in the report. For example, the access terminal may measure the signal strength of the pilot signal received at block 802 and include an indication of this value in the pilot report. In some cases, the pilot signal strength indication for each advertised pilot signature indicator also may be set to this same value. Alternatively, the access terminal may include any pilot signal strength information received at block 806 in the pilot report entry for each advertised pilot signature indicator.

As represented by block 812, the access terminal transmits the pilot report (e.g., a PSMM or Route Update) generated at block 810. For example, the access terminal may send the report to a serving macro access point (e.g., a macro base station or access network) for further processing.

Figure 9:
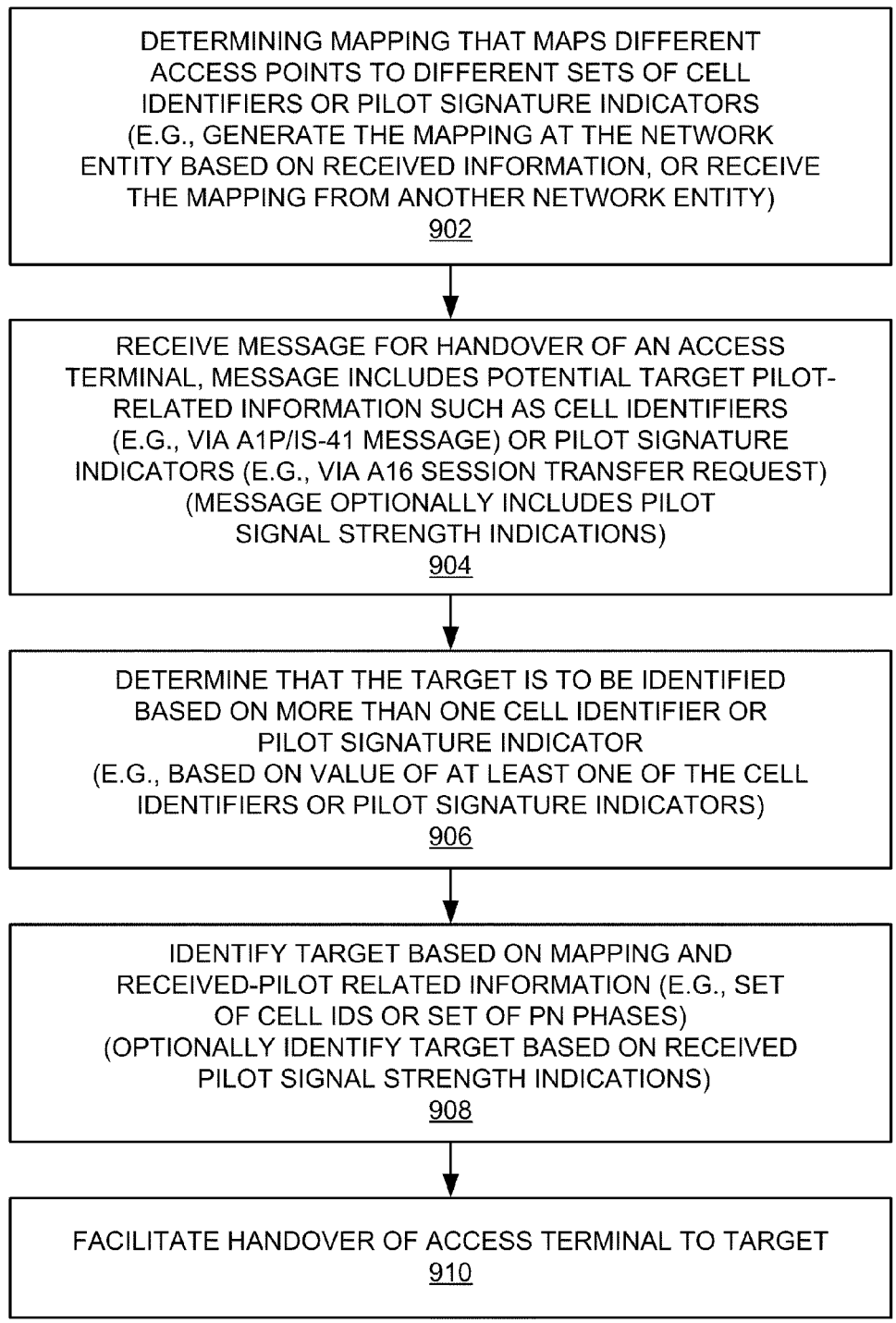
FIG. 9 is a flowchart of several sample aspects of operations that may be performed in conjunction with identifying a target access point based on pilot signature indicator-based information.

FIG. 9 describes sample operations that may be performed in conjunction with identifying a handover target based on access point pilot signature information as taught herein. Two versions of these operations are described. One version (e.g., corresponding to the system 500 of FIG. 5) uses pilot signature indicators such as PN phase indicators to identify a target and the other version (e.g., corresponding to the system 400 of FIG. 4) uses cell identifiers to identity a target. These operations may be performed, for example, by a network entity such as a femto convergence server, a femto gateway, or an access network.

As represented by block 902, at some point in time, a pilot signature indicator mapping or a cell identifier mapping is determined for a set of access points. Here, a pilot signature indicator mapping maps different access points with different sets of pilot signature indicators. For example, a given access point may be mapped to the two PN phases (corresponding to two PN offsets) that were allocated for that access point by the femto convergence server. Similarly, a cell identifier mapping maps different access points with different set of cells identifiers. For example, a given access point may be mapped to two cell identifiers (corresponding to two PN offsets) allocated for that access point by the femto convergence server.

An entity may determine this mapping in various ways. In some implementations, a network entity (e.g., a femto convergence server or a femto gateway) generates the mapping (e.g., based on configuration information received from the femto management system). In some implementations the network entity receives the mapping from another network entity (e.g., from the femto management system).

As represented by block 904, at some point in time, the network entity receives a message for handover of an access terminal. As discussed herein, this message may include, for example, pilot signature indicators (e.g., for system 500) or cell identifiers (e.g., for system 400). In addition, this message may include received pilot signal strength indications as discussed herein.

As represented by block 906, the network entity may determine whether more than one pilot signature indictor or cell identifier is needed for identifying a target access point. For example, in accordance with conventional practice, a PN phase or cell identifier identified in the handover message (i.e., from the pilot report) may be uniquely associated with a single access point (e.g., a non-femto cell). In the event this PN phase or cell identifier is associated with the strongest received pilot strength, the target may be identified based solely on the corresponding pilot signature indicator or cell identifier.

For other access points (e.g. femto cells), however, unique identification of the access point is achieved only through the use of multiple pilot signature indicators or cell identifiers. In accordance with the teachings herein, the network entity may determine whether multiple pilot signature indicators or cell identifiers need to be used to identify a target based on analysis of the pilot signature indicators received in the message. For example, as discussed above, a dedicated set of PN offsets may be allocated for being advertised only (i.e., not used for sending an actual pilot signal). Thus, the value (e.g., PN phase 2-15) of a pilot signature indicator or cell identifier (e.g., cell ID 2-15) may indicate that it is associated with a specific type of access point (e.g., femto cell) and that this pilot signature indicator or cell identifier is to be used in conjunction with at least one other pilot signature indicator or cell identifier to uniquely identify an access point.

As represented by block 908, the target access point for handover of the access terminal is identified based on the mapping and the received pilot signature-related information. For example, the network entity may compare the received PN phase indicators (or cell identifiers) with the entries in the mapping to identify the access point that transmitted the pilot signal and the message that caused these PN phases indicators (or cell identifiers) to be sent to the target network entity. As a specific example, if the highest received signal strength in the measurement report is associated with PN phases 0 and 2, the network entity determines which entry in the mapping contains this set of PN phases. The network entity may then look up the identity of the corresponding access point from this entry.

Also, in some cases, the identification of the target access point is based on the received pilot signal strength indications. For example, in a situation where multiple access points are identified by the received pilot signature-related information, the access point associated with the highest pilot signal strength indication (e.g., for the actual pilot signal) may be selected.

In addition, in some implementations, the pilot signal strength indications are used to form the identity signature for an access point. In this case, the mapping determined at block 902 will include the pilot signal strength information that was designated for the access points. The network entity may thus identify a target access point by comparing the pilot signal strength indications received at block 904 with the pilot signal strength indicator entries in the mapping. For example, two different access points may be allocated the same PN offsets, but different pilot signal strength indications. Thus, the identification of an access point may be based on both the PN offsets and the pilot signal strength indications.

As represented by block 910, once the appropriate target has been identified, the network entity may facilitate handover of the access terminal to the target (e.g., by informing the source access point of the identity of the target access point).

Figure 10:
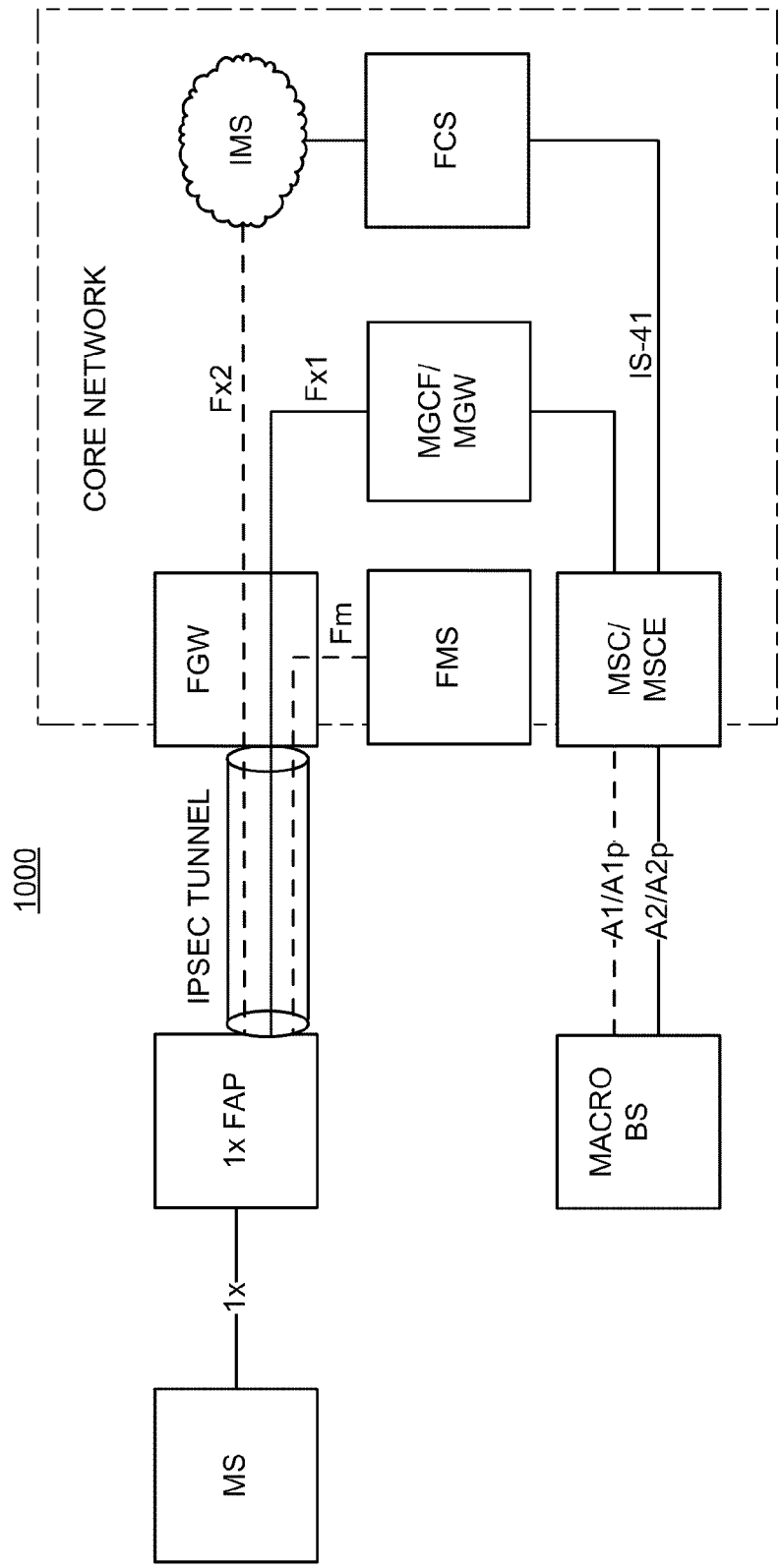
FIG. 10 is a simplified block diagram of several sample aspects of a CDMA 1× communication system adapted to identify an access point based on a plurality of pilot signature indicators.
Figure 11:
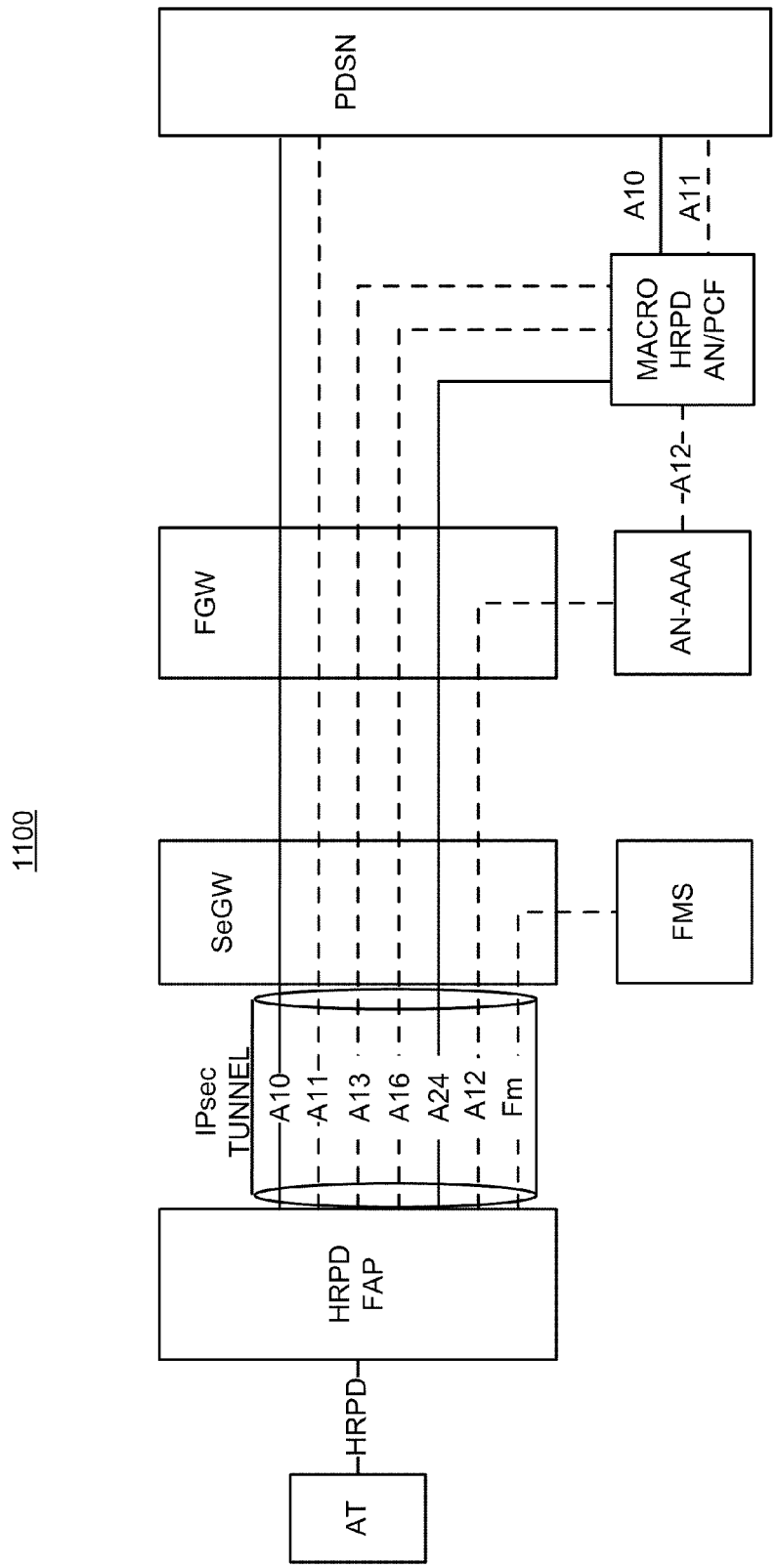
FIG. 11 is a simplified block diagram of several sample aspects of a CDMA HRPD communication system adapted to identify an access point based on a plurality of pilot signature indicators.

For purposes of illustration, FIGS. 10 and 11 illustrate how messaging as taught herein may be implemented in different types of network architectures. FIG. 10 depicts a simplified example of a CDMA 1× femto system 1000 (e.g., corresponding to the system 400 of FIG. 4). FIG. 11 depicts a simplified example of a CDMA HRPD femto system 1100 (e.g., corresponding to the system 500 of FIG. 5).

Referring initially to FIG. 10, a femto access point (FAP) communicates with a core network via a femto gateway (FGW). An IPsec tunnel is established between the femto access point and the femto gateway for carrying, for example, user traffic, Internet Protocol (IP) traffic, and control traffic. For example, the media gateway control function/media gateway (MGCF/MGW) facilitates the transfer of user traffic from the core network to the femto access point via an Fx1 interface. Similarly, an Fx2 interface is used to transfer IMS traffic to and from the femto access point. A femto management system (FMS) sends configuration and other information to the femto access point via an Fm interface and to other network entities such as a femto convergence server (connection not shown).

An example of handover operations performed by the system 1000 in accordance with the teachings herein follows. A mobile station (MS) receives an APIDM including at least one PN offset from the femto access point (FAP) and sends a PSMM including the corresponding PN phase information to a macro base station (BS). The macro BS converts the pilot PN phase information to cell identifiers and sends the resulting pilot signature information to the MSC/MSCe via the A1/A1p interface. Here, a femto convergence server (FCS) appears as a target mobile switching center (MSC) to the macro 1× infrastructure system. Thus, the FCS identifies the target 1× femto access point based on information the FCS receives via an IS-41 FACDIR2 message from the MSC/MSCe.

Referring to FIG. 11, a femto access point (FAP) communicates with the network via a security gateway (SeGW) and a femto gateway (FGW). An IPsec tunnel is established between the femto access point and the security gateway for carrying, for example, user traffic, Internet Protocol (IP) traffic, and control traffic. For example, traffic between the femto access point and a macro HRPD access network/packet control function (AN/PCF) is carried over the A13, A16 and A24 interfaces. Traffic between the femto access point and an access network-authentication, authorization and accounting entity (AN-AAA) is carried over an A12 interface. Traffic between the femto access point and a packet data serving node (PDSN) is carried over the A10 and A11 interfaces. A femto management system (FMS) sends configuration and other information to the femto access point via an Fm interface and to other network entities such as the femto gateway (connection not shown).

An example of handover operations performed by the system 1100 in accordance with the teachings herein follows. An access terminal (AT) receives an APIDM including at least one PN offset from the femto access point (FAP) and sends a PSMM including the corresponding PN phase information to a macro access network (AN) entity. The macro access network sends the PN phase information to the femto gateway via an embedded Route Update message sent over the A16 interface. Here, the femto gateway performs an A16 proxy function to allow the macro access network to handoff to the femto system without requiring any changes to the macro access network. The femto gateway identifies the target femto access point based on the information in the Route Update message.

Various fields that may be provided in a message such an APIDM to support pilot signature indicators as taught herein. Two examples follow.

In a first example, a first field (e.g., 1 bit) corresponding to a variable HO_PN_GROUP_INCL is set to a 1 when a PN offset group is advertised in the message. Otherwise the first field is set to a 0. A second field (e.g., 0 or 4 bits) corresponding to a variable HO_PN_GROUP_COUNT contains the number of PN offsets following this field. A third field (e.g., 0 or (9×LOC_REC_LEN) bits) corresponding to a variable PN_OFFSET_GROUP contains an array of 9-bit fields, each listing PN offsets. Here, LOC_REC_LEN may correspond to maximum number of available PN offsets. Also, the numbering (or offsetting) of these PN offsets may need to be compatible with the PN_Inc (indicative of the phase spacing being employed) of the macro base stations.

In a second example (see Table 3.7.2.3.2.39-5 in C.S0005-E v2.0), an APIDM includes a first field (e.g., 3 bits) corresponding to a variable HO_INFO_TYPE that is set to different values to indicate the type of information that is included in a third field. For example, a value of "001" in the first field indicates that the third field includes a signature for a PSMM. Conversely, a value of "010" in the first field indicates that the third field includes a signature for a Route Update message. A second field (e.g., 8 bits) corresponding to a variable HO_INFO_LEN is set to the length of the third field. The third field (e.g., HO_INFO_LEN bits) includes information that depends on the value of the first field as described above.

For a HO_INFO_TYPE of "001", the third field includes a PSMM_SIG_COUNT field (e.g., 3 bits) and a PSMM_SIGNATURE field (e.g., 21 bits). The PSMM_SIG_COUNT field is set to the number of occurrences of the PSMM_SIGNATURE field. The PSMM_SIGNATURE field is set to the signature of the base station to be included in PSMM during handoff. The 15 MSBs are used in PILOT_PN_PHASE field and the 6 LSBs are used in PILOT_STRENGTH field.

For a HO_INFO_TYPE of "010", the third field includes a RUP_SIG_COUNT field (e.g., 3 bits) and a RUP_SIGNATURE field (e.g., 21 bits). The RUP_SIG_COUNT field is set to the number of occurrences of the RUP_SIGNATURE field. The RUP_SIGNATURE field is set to the signature to be included in a Route Update message during handoff from another HRPD access network to the HRPD access network associated with the base station. The 15 MSBs are used in PilotPNPhase field and the 6 LSBs are used in PilotStrength field.

Various advantages may be achieved in a system implemented in accordance with the teachings herein. Significantly, the macro infrastructure need not be upgraded to support handover (e.g., active handover to femto cells) as taught herein. Rather, existing database structures (e.g., PN phase and cell identifier lists) only need to be configured to include the additional allocated PN phases, cell identifiers, etc. Moreover, due to the large number of unique signatures that may be created (e.g., by allocating 2, 3, 4, or more PN offsets for an access point), accurate handover may always be achieved for any currently practical system. Also, the described techniques are scalable since, for example, the size of the allocated PN offset groups may be expanded as needed. Also, the described techniques involve relatively simple algorithms in the femto convergence server and the femto gateway.

Figure 12:
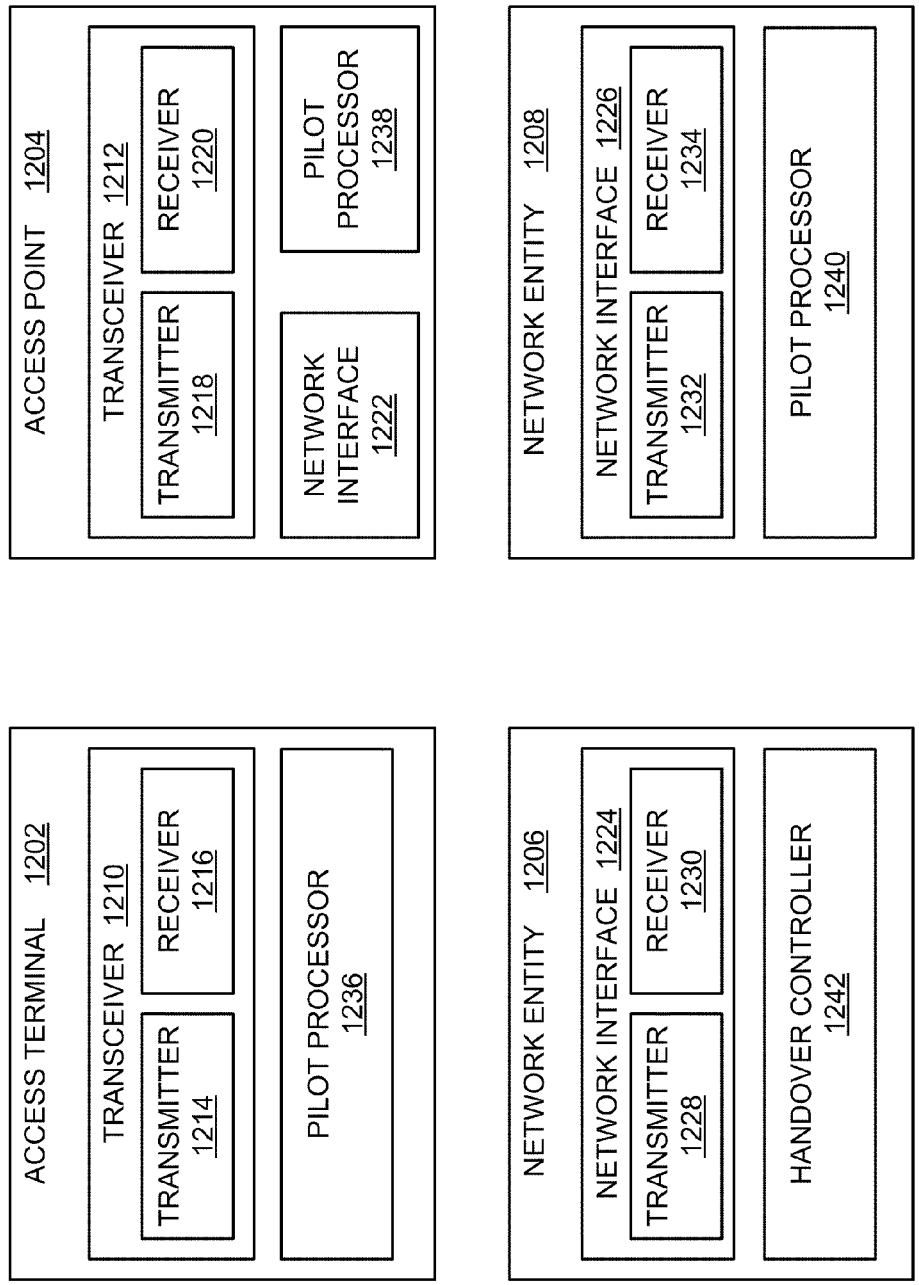
FIG. 12 is a simplified block diagram of several sample aspects of components that may be employed in communication nodes.

FIG. 12 illustrates several sample components that may be incorporated into nodes such as an access terminal 1202, an access point 1204 (e.g., a femto cell), a network entity 1206 (e.g., a FCS or a FGW), and a network entity 1208 (e.g., an FMS) to perform access point identification operations as taught herein. In practice, the described components also may be incorporated into other nodes in a communication system. For example, other nodes in a system may include components similar to those described for the network entity 1208 to provide similar allocation functionality. Also, a given node may contain one or more of the described components. For example, an access point may contain multiple transceiver components that enable the access point to operate on multiple frequencies and/or communicate via different technologies.

As shown in FIG. 12, the access terminal 1202 and the access point 1204 include transceivers 1210 and 1212, respectively, for communicating with other nodes. The transceiver 1210 includes a transmitter 1214 for sending signals (e.g., messages and reports) and a receiver 1216 for receiving signals (e.g., pilot signals and messages). Similarly, the transceiver 1212 includes a transmitter 1218 for sending signals (e.g., pilot signals and messages) and a receiver 1220 for receiving signals (e.g., messages, indicators, and indications).

The access point 1204, the network entity 1206, and the network entity 1208 include network interfaces 1222, 1224, and 1226, respectively, for communicating with other nodes (e.g., other network nodes). For example, the network interfaces 1222, 1224, and 1226 may be configured to communicate with one or more network nodes via a wire-based or wireless backhaul. In some aspects, each network interface may be implemented as a transceiver configured to support wire-based or wireless communication. For example, the network interface 1224 is depicted as including a transmitter component 1228 (e.g., for sending messages) and a receiver component 1230 (e.g., for receiving messages), while the network interface 1226 is depicted as including a transmitter component 1232 (e.g., for sending messages) and a receiver component 1234 (e.g., for receiving messages).

The access terminal 1202, the access point 1204, the network entity 1206, and the network entity 1208 also include other components that may be used in conjunction with access point identification operations as taught herein. For example, the access terminal 1202 includes a pilot processor 1236 for performing pilot signature-related operations (e.g., generating a pilot report, determining pilot phase values, identifying pilot signatures) and for providing other related functionality as taught herein. The access point 1204 includes a pilot processor 1238 for performing pilot signature-related operations (e.g., generating messages including pilot signature-related indications, defining pilot signal strength indications) and for providing other related functionality as taught herein. The network entity 1208 includes a pilot processor 1240 for performing pilot signature-related operations (e.g., allocating pilot signature indicators, defining pilot signal strength indications, determining that more than one pilot signature indicator is to be allocated, identifying unallocated pilot signatures) and for providing other related functionality as taught herein. The network entity 1206 includes a handover controller 1242 for performing handover-related operations (e.g., determining a cell identifier mapping, determining a pilot signature indicator mapping, identifying a handover target, determining that a target is to be identified from a plurality of cell identifiers) and for providing other related functionality as taught herein.

In some implementations, the components of FIG. 12 may be implemented in one or more processors (e.g., that uses and/or incorporates data memory for storing information or code used by the processor(s) to provide this functionality). For example, the functionality of pilot processor 1236 (and optionally some of the functionality of transceiver 1210) may be implemented by a processor or processors of an access terminal and data memory of the access terminal (e.g., by execution of appropriate code and/or by appropriate configuration of processor components). Similarly, the functionality of pilot processor 1238 (and optionally some of the functionality of transceiver 1212 and/or network interface 1222) may be implemented by a processor or processors of an access point and data memory of the access point (e.g., by execution of appropriate code and/or by appropriate configuration of processor components). The functionality of handover controller 1242 (and optionally some of the functionality of network interface 1224) may be implemented by a processor or processors of a network entity and data memory of the network entity (e.g., by execution of appropriate code and/or by appropriate configuration of processor components). The functionality of pilot processor 1240 (and optionally some of the functionality of network interface 1226) may be implemented by a processor or processors of a network entity and data memory of the network entity (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access network, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 13:
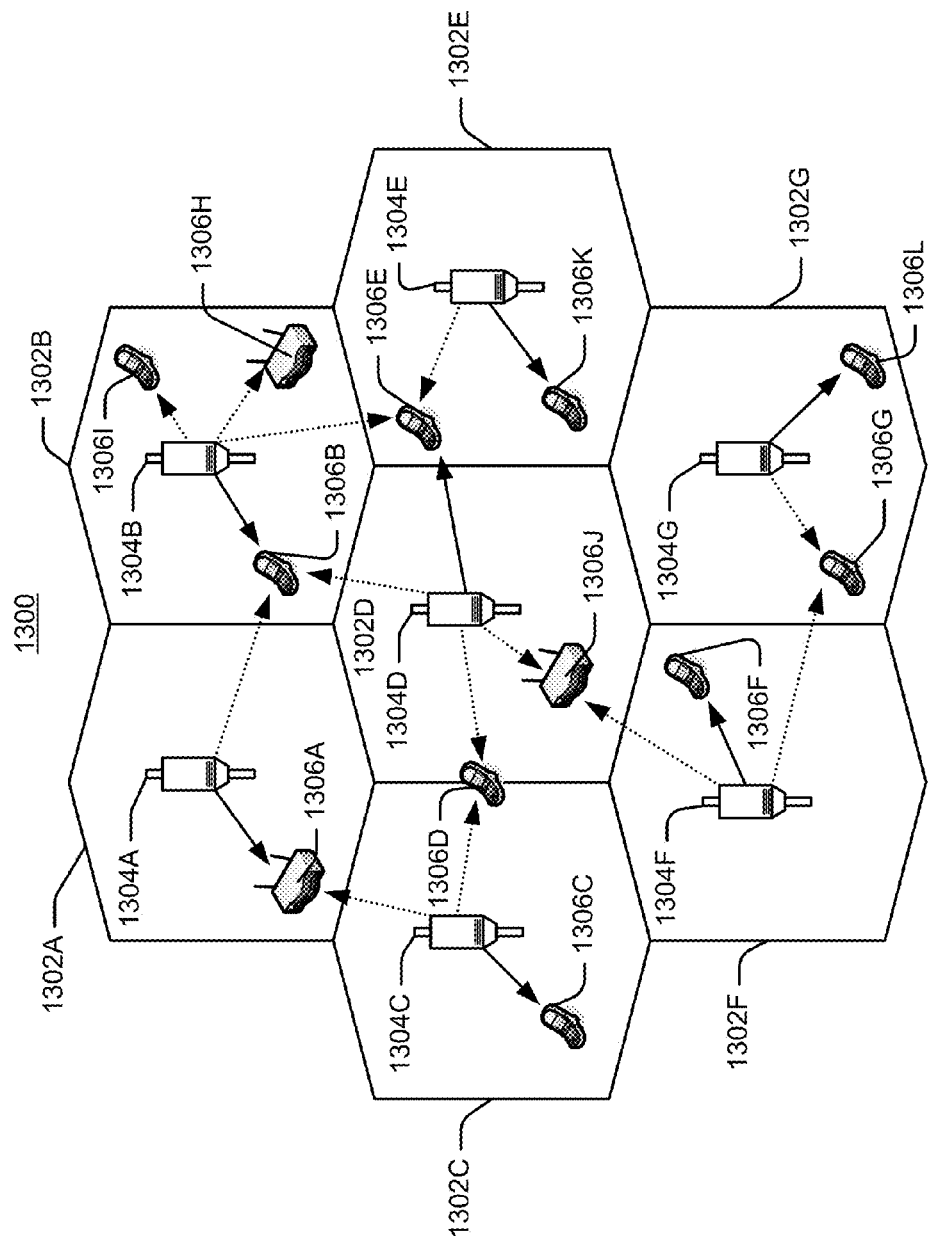
FIG. 13 is a simplified diagram of a wireless communication system.

FIG. 13 illustrates a wireless communication system 1300, configured to support a number of users, in which the teachings herein may be implemented. The system 1300 provides communication for multiple cells 1302, such as, for example, macro cells 1302A-1302G, with each cell being serviced by a corresponding access point 1304 (e.g., access points 1304A-1304G). As shown in FIG. 13, access terminals 1306 (e.g., access terminals 1306A-1306L) may be dispersed at various locations throughout the system over time. Each access terminal 1306 may communicate with one or more access points 1304 on a forward link (FL) and/or a reverse link (RL) at a given moment, depending upon whether the access terminal 1306 is active and whether it is in soft handoff, for example. The wireless communication system 1300 may provide service over a large geographic region. For example, macro cells 1302A-1302G may cover a few blocks in a neighborhood or several miles in rural environment.

Figure 14:
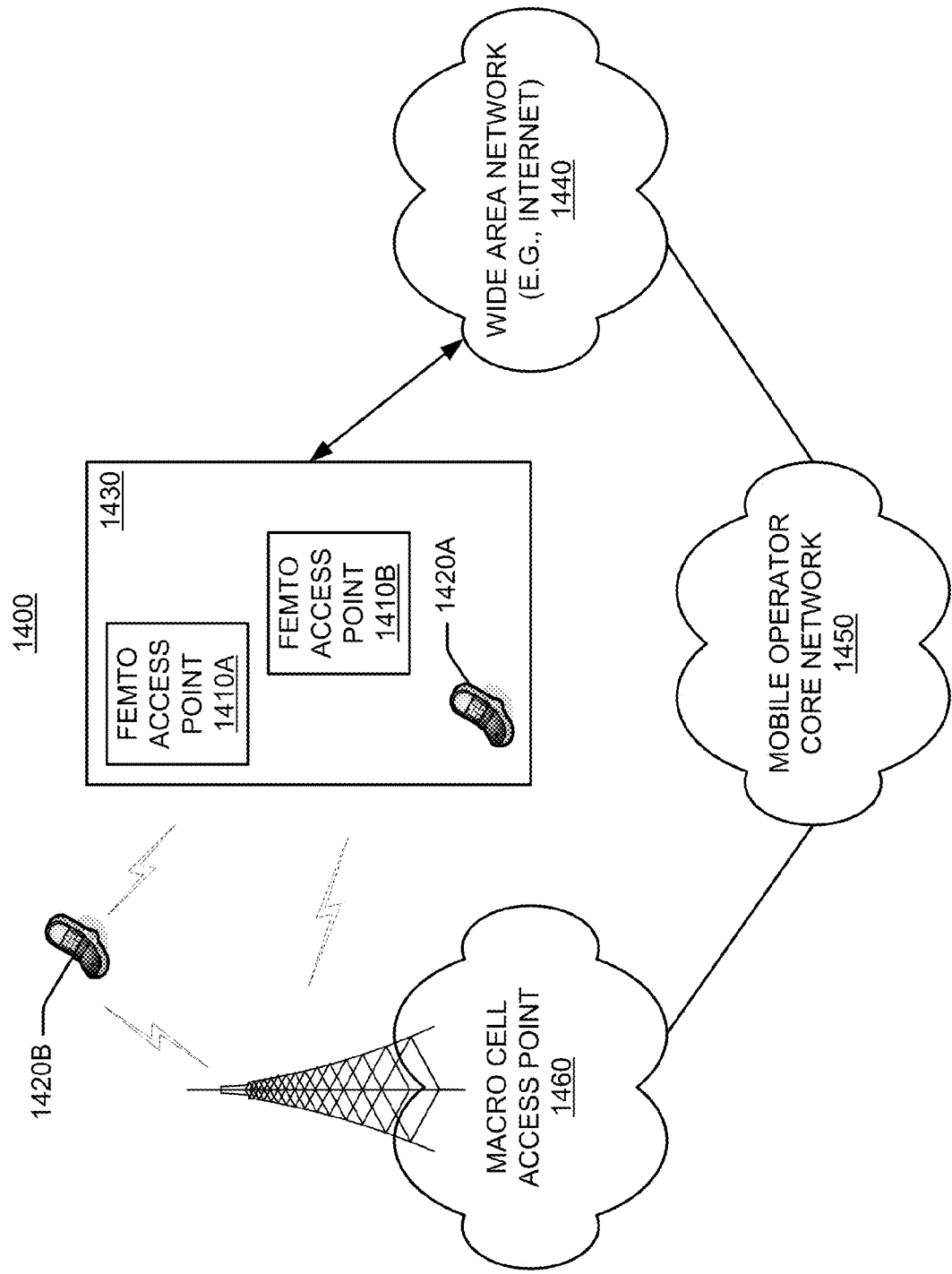
FIG. 14 is a simplified diagram of a wireless communication system including femto nodes.

FIG. 14 illustrates an exemplary communication system 1400 where one or more femto access points are deployed within a network environment. Specifically, the system 1400 includes multiple femto access points 1410 (e.g., femto access points 1410A and 1410B) installed in a relatively small scale network environment (e.g., in one or more user residences 1430). Each femto access point 1410 may be coupled to a wide area network 1440 (e.g., the Internet) and a mobile operator core network 1450 via a DSL router, a cable modem, a wireless link, or other connectivity means (not shown). As will be discussed below, each femto access point 1410 may be configured to serve associated access terminals 1420 (e.g., access terminal 1420A) and, optionally, other (e.g., hybrid or alien) access terminals 1420 (e.g., access terminal 1420B). In other words, access to femto access points 1410 may be restricted whereby a given access terminal 1420 may be served by a set of designated (e.g., home) femto access point(s) 1410 but may not be served by any non-designated femto access points 1410 (e.g., a neighbor's femto access point 1410).

Figure 15:
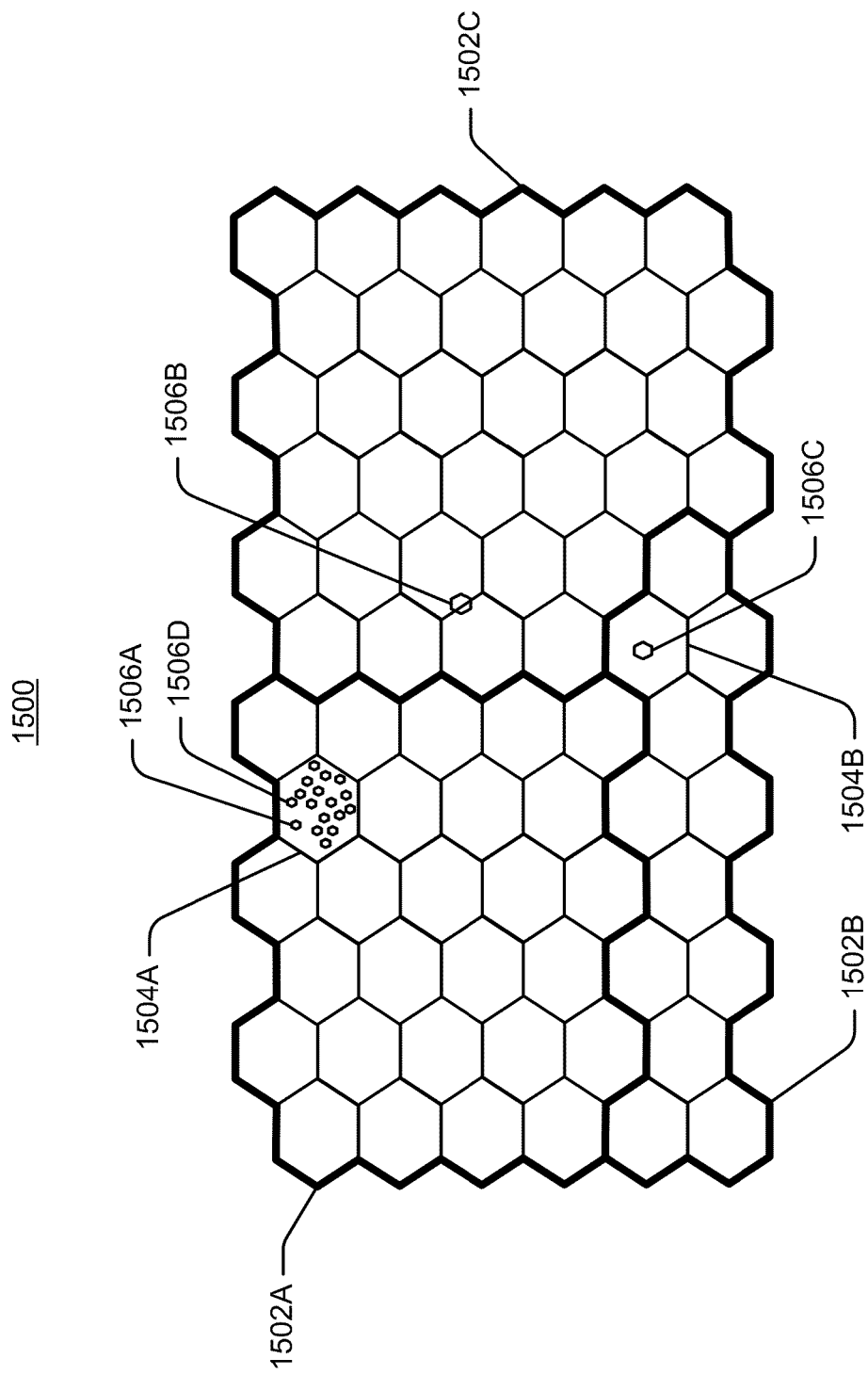
FIG. 15 is a simplified diagram illustrating coverage areas for wireless communication.

FIG. 15 illustrates an example of a coverage map 1500 where several tracking areas 1502 (or routing areas or location areas) are defined, each of which includes several macro coverage areas 1504. Here, areas of coverage associated with tracking areas 1502A, 1502B, and 1502C are delineated by the wide lines and the macro coverage areas 1504 are represented by the larger hexagons. The tracking areas 1502 also include femto coverage areas 1506. In this example, each of the femto coverage areas 1506 (e.g., femto coverage areas 1506B and 1506C) is depicted within one or more macro coverage areas 1504 (e.g., macro coverage areas 1504A and 1504B). It should be appreciated, however, that some or all of a femto coverage area 1506 may not lie within a macro coverage area 1504. In practice, a large number of femto coverage areas 1506 (e.g., femto coverage areas 1506A and 1506D) may be defined within a given tracking area 1502 or macro coverage area 1504. Also, one or more pico coverage areas (not shown) may be defined within a given tracking area 1502 or macro coverage area 1504.

Referring again to FIG. 14, the owner of a femto access point 1410 may subscribe to mobile service, such as, for example, 3G mobile service, offered through the mobile operator core network 1450. In addition, an access terminal 1420 may be capable of operating both in macro environments and in smaller scale (e.g., residential) network environments. In other words, depending on the current location of the access terminal 1420, the access terminal 1420 may be served by a macro cell access point 1460 associated with the mobile operator core network 1450 or by any one of a set of femto access points 1410 (e.g., the femto access points 1410A and 1410B that reside within a corresponding user residence 1430). For example, when a subscriber is outside his home, he is served by a standard macro access point (e.g., access point 1460) and when the subscriber is at home, he is served by a femto access point (e.g., access point 1410A). Here, a femto access point 1410 may be backward compatible with legacy access terminals 1420.

A femto access point 1410 may be deployed on a single frequency or, in the alternative, on multiple frequencies. Depending on the particular configuration, the single frequency or one or more of the multiple frequencies may overlap with one or more frequencies used by a macro access point (e.g., access point 1460).

In some aspects, an access terminal 1420 may be configured to connect to a preferred femto access point (e.g., the home femto access point of the access terminal 1420) whenever such connectivity is possible. For example, whenever the access terminal 1420A is within the user's residence 1430, it may be desired that the access terminal 1420A communicate only with the home femto access point 1410A or 1410B.

In some aspects, if the access terminal 1420 operates within the macro cellular network 1450 but is not residing on its most preferred network (e.g., as defined in a preferred roaming list), the access terminal 1420 may continue to search for the most preferred network (e.g., the preferred femto access point 1410) using a better system reselection (BSR) procedure, which may involve a periodic scanning of available systems to determine whether better systems are currently available and subsequently acquire such preferred systems. The access terminal 1420 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1410, the access terminal 1420 selects the femto access point 1410 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1410 that reside within the corresponding user residence 1430). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 16:
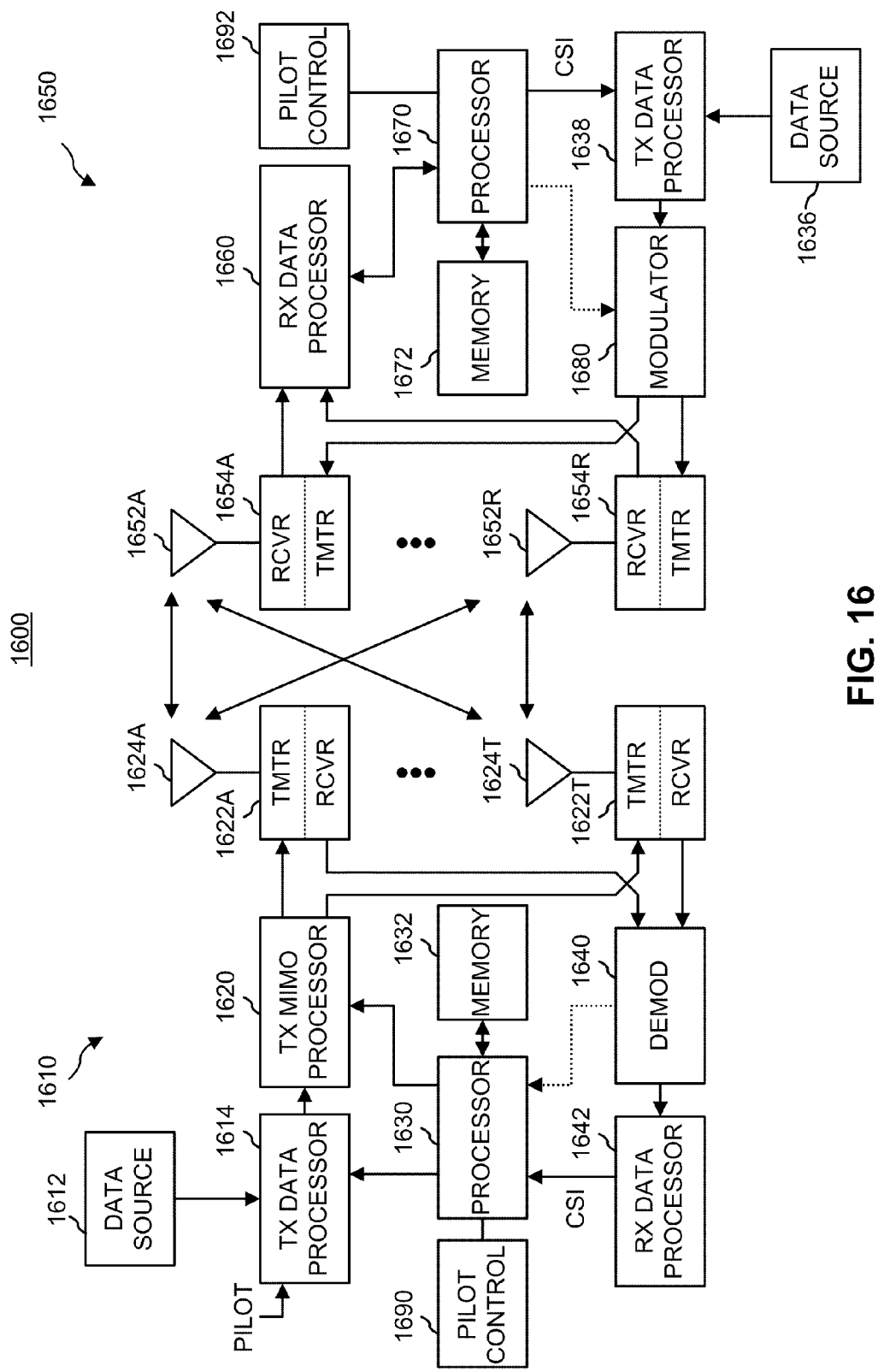
FIG. 16 is a simplified block diagram of several sample aspects of communication components.
Figure 17:
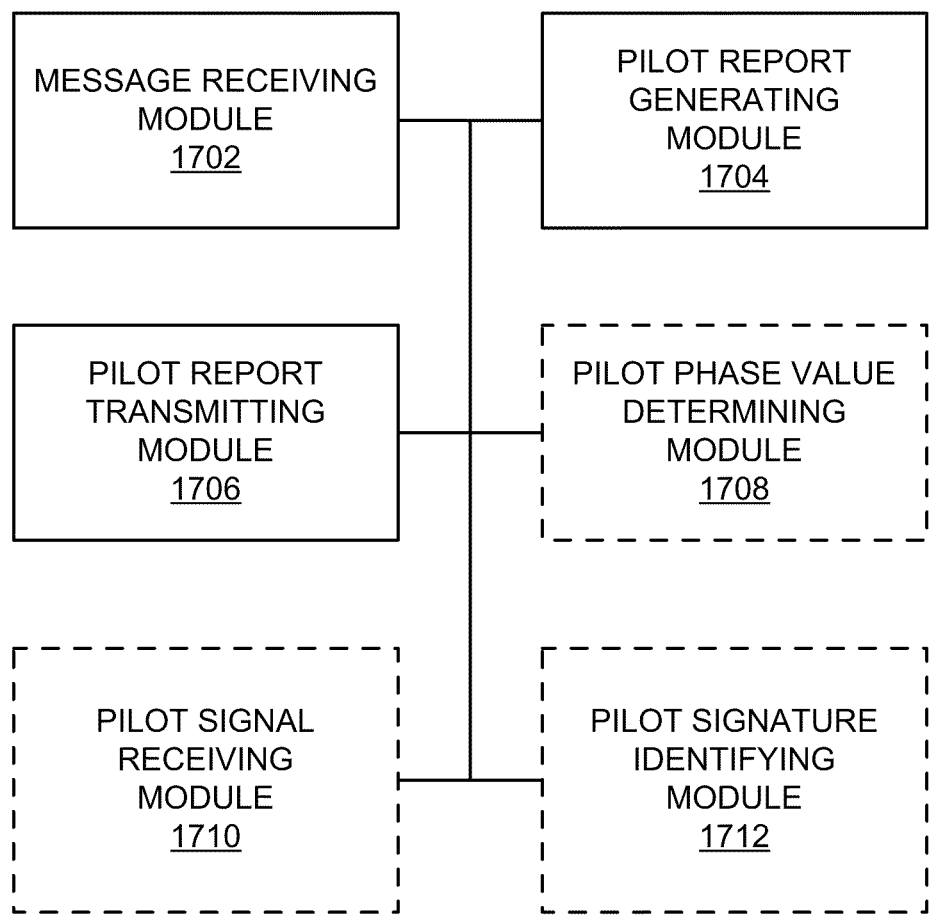
FIGS. 17-21 are simplified block diagrams of several sample aspects of apparatuses configured to perform operations related to identifying an access point based on a plurality of pilot signature indicators as taught herein.
Figure 18:
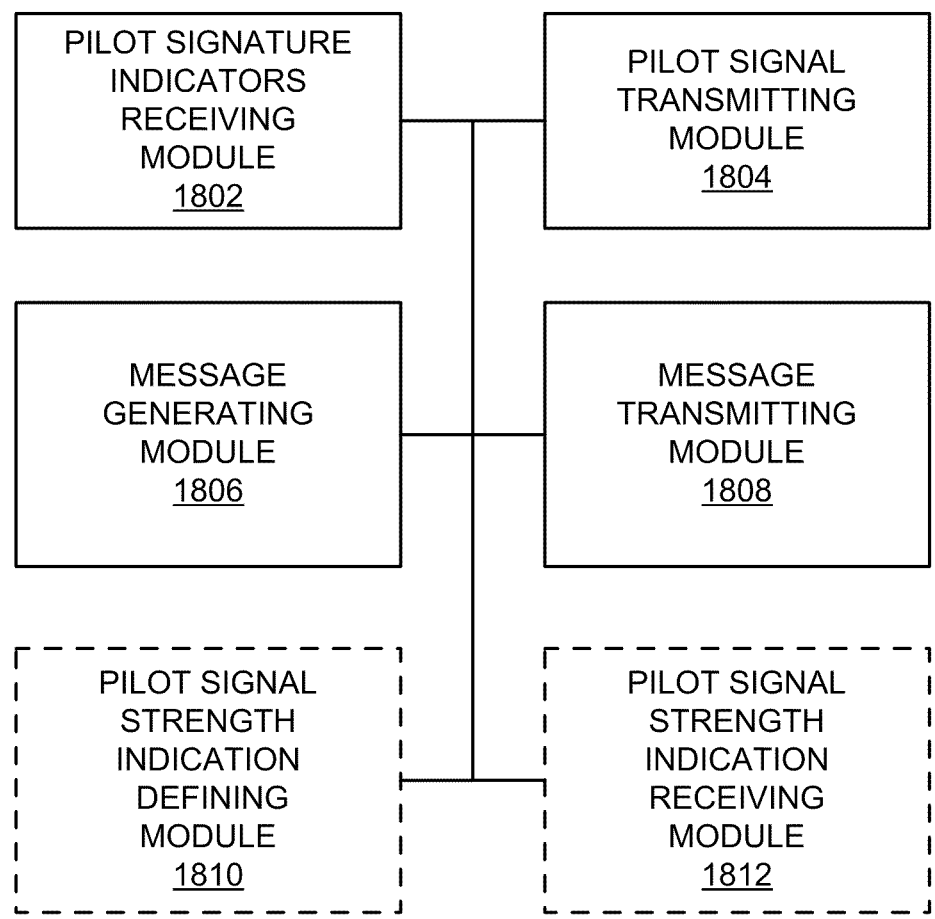
Figure 19:
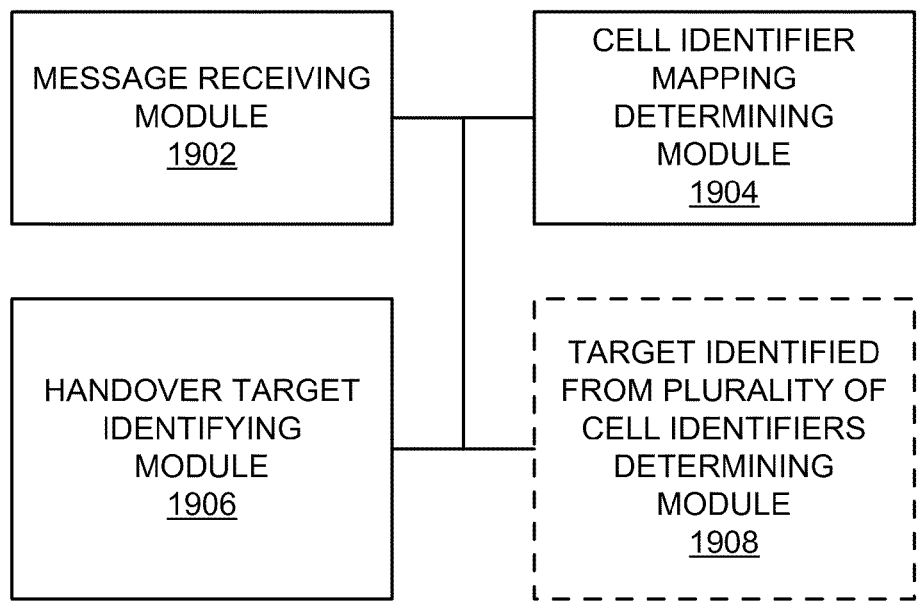
Figure 20:
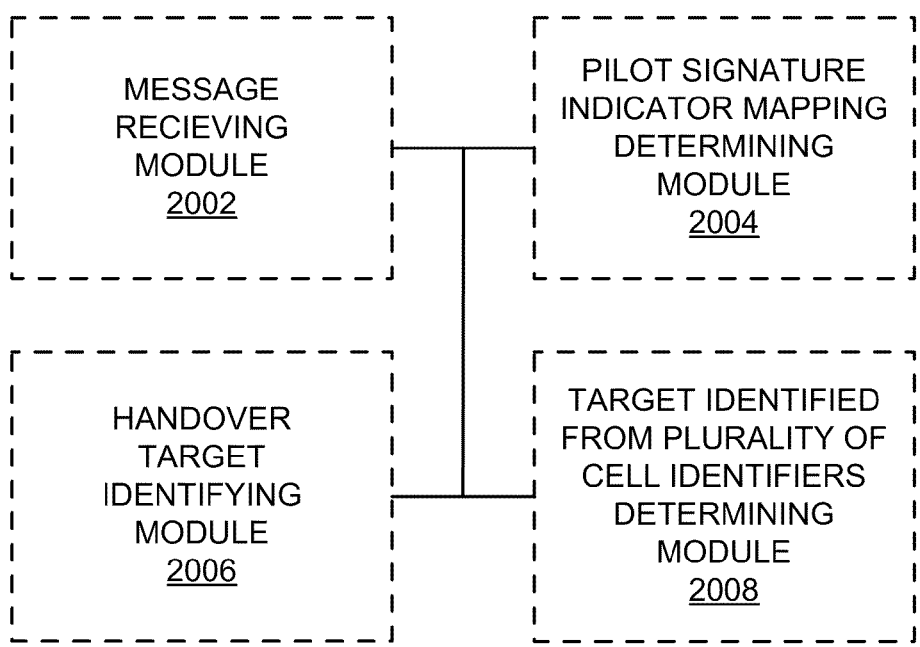
Figure 21:
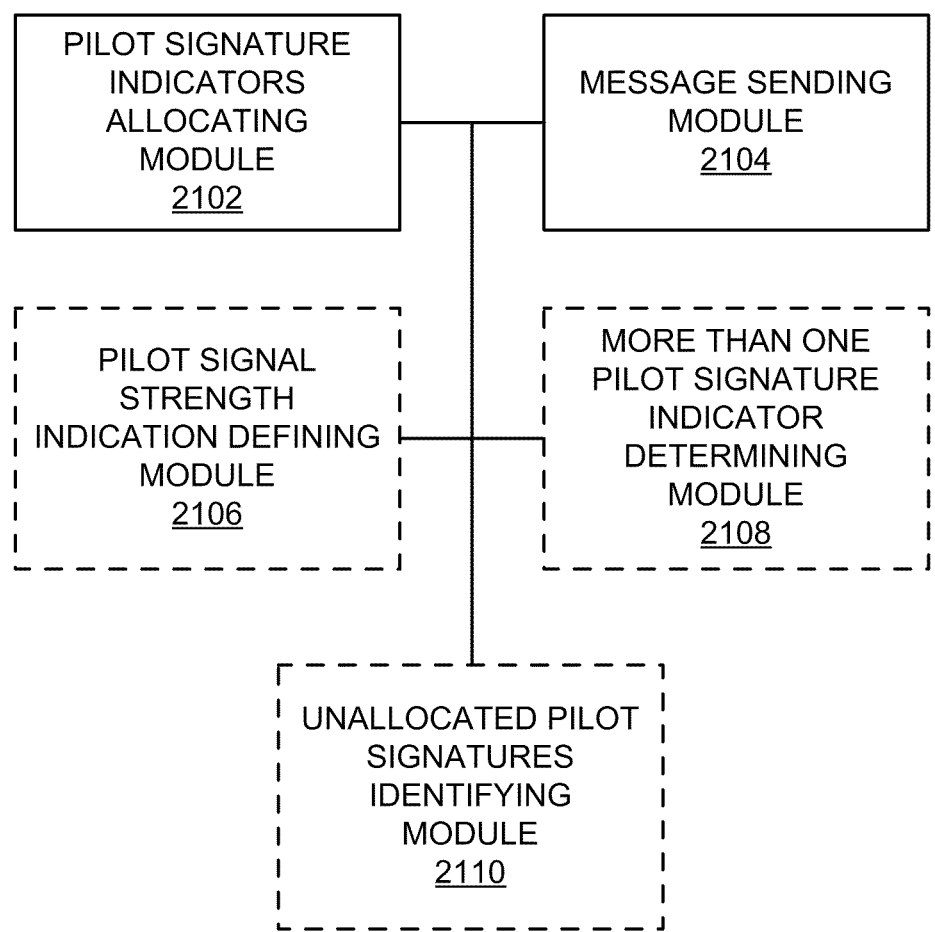

FIG. 16 illustrates a wireless device 1610 (e.g., an access point) and a wireless device 1650 (e.g., an access terminal) of a sample MIMO system 1600. At the device 1610, traffic data for a number of data streams is provided from a data source 1612 to a transmit (TX) data processor 1614. Each data stream may then be transmitted over a respective transmit antenna.

The TX data processor 1614 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1630. A data memory 1632 may store program code, data, and other information used by the processor 1630 or other components of the device 1610.

The modulation symbols for all data streams are then provided to a TX MIMO processor 1620, which may further process the modulation symbols (e.g., for OFDM). The TX MIMO processor 1620 then provides $N_T$ modulation symbol streams to $N_T$ transceivers (XCVR) 1622A through 1622T. In some aspects, the TX MIMO processor 1620 applies beam-forming weights to the symbols of the data streams and to the antenna from which the symbol is being transmitted.

Each transceiver 1622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1622A through 1622T are then transmitted from $N_T$ antennas 1624A through 1624T, respectively.

At the device 1650, the transmitted modulated signals are received by $N_R$ antennas 1652A through 1652R and the received signal from each antenna 1652 is provided to a respective transceiver (XCVR) 1654A through 1654R. Each transceiver 1654 conditions (e.g., filters, amplifies, and downconverts) a respective received signal, digitizes the conditioned signal to provide samples, and further processes the samples to provide a corresponding "received" symbol stream.

A receive (RX) data processor 1660 then receives and processes the $N_R$ received symbol streams from $N_R$ transceivers 1654 based on a particular receiver processing technique to provide $N_T$ "detected" symbol streams. The RX data processor 1660 then demodulates, deinterleaves, and decodes each detected symbol stream to recover the traffic data for the data stream. The processing by the RX data processor 1660 is complementary to that performed by the TX MIMO processor 1620 and the TX data processor 1614 at the device 1610.

A processor 1670 periodically determines which pre-coding matrix to use (discussed below). The processor 1670 formulates a reverse link message comprising a matrix index portion and a rank value portion. A data memory 1672 may store program code, data, and other information used by the processor 1670 or other components of the device 1650.

The reverse link message may comprise various types of information regarding the communication link and/or the received data stream. The reverse link message is then processed by a TX data processor 1638, which also receives traffic data for a number of data streams from a data source 1636, modulated by a modulator 1680, conditioned by the transceivers 1654A through 1654R, and transmitted back to the device 1610.

At the device 1610, the modulated signals from the device 1650 are received by the antennas 1624, conditioned by the transceivers 1622, demodulated by a demodulator (DEMOD) 1640, and processed by a RX data processor 1642 to extract the reverse link message transmitted by the device 1650. The processor 1630 then determines which pre-coding matrix to use for determining the beam-forming weights then processes the extracted message.

FIG. 16 also illustrates that the communication components may include one or more components that perform pilot control operations as taught herein. For example, a pilot control component 1690 may cooperate with the processor 1630 and/or other components of the device 1610 to receive pilot-related signals from another device (e.g., device 1650) and transmit pilot reports as taught herein. Similarly, a pilot control component 1692 may cooperate with the processor 1670 and/or other components of the device 1650 to send pilot signals to another device (e.g., device 1610) and receive configuration information from another device as taught herein. It should be appreciated that for each device 1610 and 1650 the functionality of two or more of the described components may be provided by a single component. For example, a single processing component may provide the functionality of the pilot control component 1690 and the processor 1630 and a single processing component may provide the functionality of the pilot control component 1692 and the processor 1670.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Re10, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 17-21, apparatuses 1700, 1800, 1900, 2000, and 2100 are represented as a series of interrelated functional modules. Here, a message receiving module 1702 may correspond at least in some aspects to, for example, a receiver as discussed herein. A pilot report generating module 1704 may correspond at least in some aspects to, for example, a pilot processor as discussed herein. A pilot report transmitting module 1706 may correspond at least in some aspects to, for example, a transmitter as discussed herein. A pilot phase value determining module 1708 may correspond at least in some aspects to, for example, a pilot processor as discussed herein. A pilot signal receiving module 1710 may correspond at least in some aspects to, for example, a receiver as discussed herein. A pilot signature identifying module 1712 may correspond at least in some aspects to, for example, a pilot processor as discussed herein. A pilot signature indicators receiving module 1802 may correspond at least in some aspects to, for example, a receiver as discussed herein. A pilot signal transmitting module 1804 may correspond at least in some aspects to, for example, a transmitter as discussed herein. A message generating module 1806 may correspond at least in some aspects to, for example, a pilot processor as discussed herein. A message transmitting module 1808 may correspond at least in some aspects to, for example, a transmitter as discussed herein. A pilot signal strength indication defining module 1810 may correspond at least in some aspects to, for example, a pilot processor as discussed herein. A pilot signal strength indication receiving module 1812 may correspond at least in some aspects to, for example, a receiver as discussed herein. A message receiving module 1902 may correspond at least in some aspects to, for example, a receiver as discussed herein. A cell identifier mapping determining module 1904 may correspond at least in some aspects to, for example, a handover controller as discussed herein. A handover target identifying module 1906 may correspond at least in some aspects to, for example, a handover controller as discussed herein. A target identified from plurality of cell identifiers determining module 1908 may correspond at least in some aspects to, for example, a handover controller as discussed herein. A message receiving module 2002 may correspond at least in some aspects to, for example, a receiver as discussed herein. A pilot signature indicator mapping determining module 2004 may correspond at least in some aspects to, for example, a handover controller as discussed herein. A handover target identifying module 2006 may correspond at least in some aspects to, for example, a handover controller as discussed herein. A target identified from plurality of cell identifiers determining module 2008 may correspond at least in some aspects to, for example, a handover controller as discussed herein. A pilot signature indicators allocating module 2102 may correspond at least in some aspects to, for example, a pilot processor as discussed herein. A message sending module 2104 may correspond at least in some aspects to, for example, a transmitter as discussed herein. A pilot signal strength indication defining module 2106 may correspond at least in some aspects to, for example, a pilot processor as discussed herein. A more than one pilot signature indicator determining module 2108 may correspond at least in some aspects to, for example, a pilot processor as discussed herein. An unallocated pilot signatures identifying module 2110 may correspond at least in some aspects to, for example, a pilot processor as discussed herein.

The functionality of the modules of FIGS. 17-21 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 17-21 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   receiving a message from an access point at an access terminal, wherein the message includes at least one pilot signature indicator indicating one or more second pilot signatures associated with the access point that are not used for pilot signal scrambling by the access point;
   receiving a pilot signal from the access point at the access terminal scrambled using a first pilot signature different from the one or more second pilot signatures indicated by the at least one pilot signature indicator;
   generating a pilot report that includes respective different pilot signal strength indicators for the pilot signal and for the one or more second pilot signatures indicated by the at least one pilot signature indicator;
   transmitting the pilot report to a second access point; and
   handing over to the access point, wherein a femto gateway identifies the access point based on information received from the second access point and information received from a femto management system, wherein the information received from the second access point is based on the pilot report, and wherein the information received from the femto management system comprises femto cell pilot signature allocations.

2. The method of claim 1, wherein:
   the at least one pilot signature indicator comprises at least one pseudorandom noise (PN) offset value distinct from a PN offset value of the first pilot signature; and
   the pilot report further includes the at least one pseudorandom noise (PN) offset value.

3. The method of claim 1, further comprising determining at least one pilot phase value associated with the at least one pilot signature indicator, wherein the pilot report further includes at least one indication of the at least one pilot phase value.

4. The method of claim 3, wherein:
   the at least one pilot signature indicator comprises at least one pseudorandom noise (PN) offset value; and
   the determined at least one pilot phase value comprises at least one pseudorandom noise (PN) phase value.

5. The method of claim 1, wherein:
   the at least one pilot signature indicator comprises at least one pseudorandom noise (PN) phase value; and
   the pilot report further includes the at least one pseudorandom noise (PN) phase value.

6. The method of claim 1, wherein the at least one pilot signature indicator comprises at least one primary scrambling code value or at least one physical cell identifier value.

7. The method of claim 1, wherein the at least one pilot signature indicator comprises a plurality of pilot signature indicators.

8. The method of claim 1, further comprising:
   identifying the first pilot signature comprising a pseudorandom noise (PN) offset value used to scramble the pilot signal.

9. The method of claim 1, wherein the message further includes at least one of the respective different pilot signal strength indicators associated with the at least one pilot signature indicator.

10. The method of claim 9, wherein:
    the at least one pilot signature indicator comprises a plurality of pseudorandom noise (PN) offset values;
    the at least one of the respective different pilot signal strength indicators comprises a plurality of pilot signal strength indications; and
    the access point comprises a femto cell.

11. The method of claim 1, wherein the at least one pilot signature indicator comprises a value that is indicative of at least one pilot signature that is not currently allocated for pilot scrambling use by any access points associated with an area of a wireless network.

12. The method of claim 1, wherein the message comprises an access point identifier message.

13. An apparatus for communication, comprising:
    a receiver configured to receive a message from an access point at an access terminal, wherein the message includes at least one pilot signature indicator indicating one or more second pilot signatures associated with the access point that are not used for pilot signal scrambling by the access point, and to receive a pilot signal from the access point scrambled using a first pilot signature different from the one or more second pilot signatures indicated by the at least one pilot signature indicator;
    a pilot processor configured to generate a pilot report that includes respective different pilot signal strength indicators for the pilot signal and for the one or more second pilot signatures indicated by the at least one pilot signature indicator;
    a transmitter configured to transmit the pilot report to a second access point; and
    a transceiver configured to hand over to the access point, wherein a femto gateway identifies the access point based on information received from the second access point and information received from a femto management system, wherein the information received from the second access point is based on the pilot report, and wherein the information received from the femto management system comprises femto cell pilot signature allocations.

14. The apparatus of claim 13, wherein:
    the at least one pilot signature indicator comprises at least one pseudorandom noise (PN) offset value distinct from a PN offset value of the first pilot signature; and
    the pilot report further includes the at least one pseudorandom noise (PN) offset value.

15. The apparatus of claim 13, wherein:
    the at least one pilot signature indicator comprises at least one pseudorandom noise (PN) phase value; and
    the pilot report further includes the at least one pseudorandom noise (PN) phase value.

16. The apparatus of claim 13, wherein the at least one pilot signature indicator comprises a plurality of pilot signature indicators.

17. The apparatus of claim 13, wherein:
the message further includes at least one pilot signal strength indication associated with the at least one pilot signature indicator; and
the pilot report further includes the at least one pilot signal strength indication.

18. An apparatus for communication, comprising:
means for receiving a message from an access point at an access terminal, wherein the message includes at least one pilot signature indicator indicating one or more second pilot signatures associated with the access point that are not used for pilot signal scrambling by the access point;
means for receiving a pilot signal from the access point at the access terminal scrambled using a first pilot signature different from the one or more second pilot signatures indicated by the at least one pilot signature indicator;
means for generating a pilot report that includes respective different pilot signal strength indicators for the pilot signal and for the one or more second pilot signatures indicated by the at least one pilot signature indicator;
means for transmitting the pilot report to a second access point; and
means for handing over to the access point, wherein a femto gateway identifies the access point based on information received from the second access point and information received from a femto management system, wherein the information received from the second access point is based on the pilot report, and wherein the information received from the femto management system comprises femto cell pilot signature allocations.

19. The apparatus of claim 18, wherein:
the at least one pilot signature indicator comprises at least one pseudorandom noise (PN) offset value distinct from a PN offset value of the first pilot signature; and
the pilot report further includes the at least one pseudorandom noise (PN) offset value.

20. The apparatus of claim 18, wherein:
the at least one pilot signature indicator comprises at least one pseudorandom noise (PN) phase value; and
the pilot report further includes the at least one pseudorandom noise (PN) phase value.

21. The apparatus of claim 18, wherein the at least one pilot signature indicator comprises a plurality of pilot signature indicators.

22. The apparatus of claim 18, wherein the message further includes at least one of the respective different pilot signal strength indicators associated with the at least one pilot signature indicator.

23. A non-transitory computer-readable medium comprising code for causing a computer to:
receive a message from an access point at an access terminal, wherein the message includes at least one pilot signature indicator indicating one or more second pilot signatures associated with the access point that are not used for pilot signal scrambling by the access point;
receive a pilot signal from the access point at the access terminal scrambled using a first pilot signature different from the one or more second pilot signatures indicated by the at least one pilot signature indicator;
generate a pilot report that includes respective different pilot signal strength indicators for the pilot signal and for the one or more second pilot signatures indicated by the at least one pilot signature indicator;
transmit the pilot report to a second access point; and
hand over to the access point, wherein a femto gateway identifies the access point based on information received from the second access point and information received from a femto management system, wherein the information received from the second access point is based on the pilot report, and wherein the information received from the femto management system comprises femto cell pilot signature allocations.

24. The non-transitory computer-readable medium of claim 23, wherein:
the at least one pilot signature indicator comprises at least one pseudorandom noise (PN) offset value distinct from a PN offset value of the first pilot signature; and
the pilot report further includes the at least one pseudorandom noise (PN) offset value.

25. The non-transitory computer-readable medium of claim 23, wherein:
the at least one pilot signature indicator comprises at least one pseudorandom noise (PN) phase value; and
the pilot report further includes the at least one pseudorandom noise (PN) phase value.

26. The non-transitory computer-readable medium of claim 23, wherein the at least one pilot signature indicator comprises a plurality of pilot signature indicators.

27. The non-transitory computer-readable medium of claim 23, wherein:
the message further includes at least one of the respective different pilot signal strength indicators associated with the at least one pilot signature indicator.

28. A method of communication, comprising:
receiving, from a network entity, a plurality of pilot signature indicators associated with an access point and operable for scrambling respective pilot signals at the access point, wherein at least one of the pilot signature indicators is not used for pilot signal scrambling by the access point;
transmitting a pilot signal based on one of the pilot signature indicators;
generating a message including the at least one of the pilot signature indicators that is not used for pilot signal scrambling by the access point;
transmitting the message to an access terminal; and
handing over the access terminal to the access point, wherein a femto gateway facilitates the handover based on information received from a second access point and information received from a femto management system, wherein the information received from the second access point is based on a pilot report transmitted by the access terminal based on the pilot signal and the message, and wherein the information received from the femto management system comprises femto cell pilot signature indicator allocations.

29. The method of claim 28, wherein the pilot signature indicators comprise pseudorandom noise (PN) offset values.

30. The method of claim 28, wherein the pilot signature indicators comprise at least one pseudorandom noise (PN) phase value.

31. The method of claim 28, wherein the pilot signature indicators comprise primary scrambling code values or physical cell identifier values.

32. The method of claim 28, wherein the at least one of the pilot signature indicators comprises at least two of the pilot signature indicators.

33. The method of claim 28, further comprising defining at least one pilot signal strength indication.

34. The method of claim 28, further comprising receiving at least one pilot signal strength indication in conjunction with the receipt of the pilot signature indicators.

35. The method of claim 28, wherein:
the pilot signature indicators comprise pseudorandom noise (PN) offset values;
the at least one of the pilot signature indicators comprises at least two of the pseudorandom noise (PN) offset values; and
the access point comprises a femto cell.

36. The method of claim 28, wherein the pilot signature indicators are allocated for the access point to identify the access point for handover.

37. The method of claim 28, wherein the at least one of the pilot signatures indicator comprises a value that is indicative of at least one pilot signature that is not currently allocated for pilot scrambling use by any access points associated with an area of a wireless network.

38. The method of claim 28, wherein:
the access point comprises a femto cell; and
the pilot signature indicators are received from a femto management server.

39. The method of claim 28, wherein the message comprises an access point identifier message.

40. An apparatus for communication, comprising:
a receiver configured to receive, from a network entity, a plurality of pilot signature indicators associated with an access point and operable for scrambling respective pilot signals at the access point, wherein at least one of the pilot signature indicators is not used for pilot signal scrambling by the access point;
a transmitter configured to transmit a pilot signal based on one of the pilot signature indicators;
a pilot processor configured to generate a message including the at least one of the pilot signature indicators that is not used for pilot signal scrambling by the access point, wherein the transmitter is further configured to transmit the message to an access terminal; and
a transceiver configured to hand over the access terminal to the access point, wherein a femto gateway facilitates the handover based on information received from a second access point and information received from a femto management system, wherein the information received from the second access point is based on a pilot report transmitted by the access terminal based on the pilot signal and the message, and wherein the information received from the femto management system comprises femto cell pilot signature indicator allocations.

41. The apparatus of claim 40, wherein the pilot signature indicators comprise pseudorandom noise (PN) offset values.

42. The apparatus of claim 40, wherein the at least one of the pilot signature indicators comprises at least two of the pilot signature indicators.

43. The apparatus of claim 40, wherein the at least one of the pilot signature indicators comprises a value that is indicative of at least one pilot signature that is not currently allocated for pilot scrambling use by any access points associated with an area of a wireless network.

44. An apparatus for communication, comprising:
means for receiving, from a network entity, a plurality of pilot signature indicators associated with an access point and operable for scrambling respective pilot signals at the access point, wherein at least one of the pilot signature indicators is not used for pilot signal scrambling by the access point;
means for transmitting a pilot signal based on one of the pilot signature indicators;
means for generating a message including the at least one of the pilot signature indicators that is not used for pilot signal scrambling by the access point;
means for transmitting the message to an access terminal; and
means for handing over the access terminal to the access point, wherein a femto gateway facilitates the handover based on information received from a second access point and information received from a femto management system, wherein the information received from the second access point is based on a pilot report transmitted by the access terminal based on the pilot signal and the message, and wherein the information received from the femto management system comprises femto cell pilot signature indicator allocations.

45. The apparatus of claim 44, wherein the pilot signature indicators comprise pseudorandom noise (PN) offset values.

46. The apparatus of claim 44, wherein the at least one of the pilot signature indicators comprises at least two of the pilot signature indicators.

47. The apparatus of claim 44, wherein the at least one of the pilot signature indicators comprises a value that is indicative of at least one pilot signature that is not currently allocated for pilot scrambling use by any access points associated with an area of a wireless network.

48. A non-transitory computer-readable medium comprising code for causing a computer to:
receive, from a network entity, a plurality of pilot signature indicators associated with an access point and operable for scrambling respective pilot signals at the access point, wherein at least one of the pilot signature indicators is not used for pilot signal scrambling by the access point;
transmit a pilot signal based on one of the pilot signature indicators;
generate a message including the at least one of the pilot signature indicators that is not used for pilot signal scrambling by the access point;
transmit the message to an access terminal; and
hand over the access terminal to the access point, wherein a femto gateway facilitates the handover based on information received from a second access point and information received from a femto management system, wherein the information received from the second access point is based on a pilot report transmitted by the access terminal based on the pilot signal and the message, and wherein the information received from the femto management system comprises femto cell pilot signature indicator allocations.

49. The non-transitory computer-readable medium of claim 48, wherein the pilot signature indicators comprise pseudorandom noise (PN) offset values.

50. The non-transitory computer-readable medium of claim 48, wherein the at least one of the pilot signature indicators comprises at least two of the pilot signature indicators.

51. The non-transitory computer-readable medium of claim 48, wherein the at least one of the pilot signature indicators comprises a value that is indicative of at least one pilot signature that is not currently allocated for pilot scrambling use by any access points associated with an area of a wireless network.

52. The method of claim 1, wherein each of the pilot signal strength indicators for the one or more second pilot signatures comprises an artificially defined indication of pilot signal strength.

53. The method of claim 28, wherein the message includes at least one artificially defined pilot signal strength indication for the at least one of the pilot signal indicators.

\* \* \* \* \*